(12) United States Patent
Chhabra et al.

(10) Patent No.: US 12,417,187 B2
(45) Date of Patent: Sep. 16, 2025

(54) MULTI-KEY CRYPTOGRAPHIC MEMORY PROTECTION

(71) Applicant: Intel Corporation, Santa Clara, CA (US)

(72) Inventors: Siddhartha Chhabra, Portland, OR (US); Hormuzd M. Khosravi, Portland, OR (US); Gideon Gerzon, Zichron Yaakov (IL); Barry E. Huntley, Hillsboro, OR (US); Gilbert Neiger, Hillboro, OR (US); Ido Ouziel, Tel-Aviv (IL); Baiju Patel, Portland, OR (US); Ravi L. Sahita, Portland, OR (US); Amy L. Santoni, Scottsdale, AZ (US); Ioannis T. Schoinas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/222,722

(22) Filed: Apr. 5, 2021

(65) Prior Publication Data

US 2021/0224202 A1 Jul. 22, 2021

Related U.S. Application Data

(63) Continuation of application No. 15/635,548, filed on Jun. 28, 2017, now abandoned.

(51) Int. Cl.
*G06F 12/14* (2006.01)
*H04L 9/06* (2006.01)
(Continued)

(52) U.S. Cl.
CPC ........ *G06F 12/1408* (2013.01); *H04L 9/0618* (2013.01); *H04L 9/0869* (2013.01);
(Continued)

(58) Field of Classification Search
CPC ......... G06F 12/1408; G06F 2212/1052; H04L 9/0618; H04L 63/061; H04L 9/0869; H04L 9/0894
See application file for complete search history.

(56) References Cited

U.S. PATENT DOCUMENTS

| 7,434,068 B2 | 10/2008 | Nguyen et al. |
| 10,013,364 B1 | 7/2018 | Lazar et al. |

(Continued)

FOREIGN PATENT DOCUMENTS

CN 102426637 A 4/2012

OTHER PUBLICATIONS

Final Office Action, U.S. Appl. No. 15/635,548, filed Aug. 12, 2019, 23 pages.

(Continued)

*Primary Examiner* — Bassam A Noaman
(74) *Attorney, Agent, or Firm* — Nicholson De Vos Webster & Elliott LLP

(57) ABSTRACT

In one embodiment, an apparatus comprises a processor to execute instruction(s), wherein the instructions comprise a memory access operation associated with a memory location of a memory. The apparatus further comprises a memory encryption controller to: identify the memory access operation; determine that the memory location is associated with a protected domain, wherein the protected domain is associated with a protected memory region of the memory, and wherein the protected domain is identified from a plurality of protected domains associated with a plurality of protected memory regions of the memory; identify an encryption key associated with the protected domain; perform a cryptography operation on data associated with the memory access operation, wherein the cryptography operation is performed based on the encryption key associated with the protected (Continued)

domain; and return a result of the cryptography operation, wherein the result is to be used for the memory access operation.

17 Claims, 10 Drawing Sheets

(51) Int. Cl.
*H04L 9/08* (2006.01)
*H04L 9/40* (2022.01)

(52) U.S. Cl.
CPC .......... *H04L 9/0894* (2013.01); *H04L 63/061* (2013.01); *G06F 2212/1052* (2013.01)

(56) References Cited

U.S. PATENT DOCUMENTS

| | | | |
|---|---|---|---|
| 10,049,001 B1* | 8/2018 | Johnson | H04L 1/0063 |
| 2005/0188173 A1 | 8/2005 | Hasbun et al. | |
| 2005/0195660 A1* | 9/2005 | Kavuri | G06F 11/1458 |
| | | | 365/189.05 |
| 2008/0016004 A1* | 1/2008 | Kurasaki | G06Q 20/341 |
| | | | 705/67 |
| 2012/0284527 A1* | 11/2012 | Nagpal | G06F 3/0659 |
| | | | 711/E12.091 |
| 2012/0328105 A1 | 12/2012 | Mukkara et al. | |
| 2013/0238907 A1 | 9/2013 | Debout et al. | |
| 2014/0283010 A1 | 9/2014 | Rutkowski et al. | |
| 2015/0095662 A1* | 4/2015 | Jejurikar | G06F 12/14 |
| | | | 713/193 |
| 2015/0350200 A1 | 12/2015 | Li et al. | |
| 2015/0358300 A1 | 12/2015 | Urzi et al. | |
| 2016/0077966 A1 | 3/2016 | Stabrawa et al. | |
| 2017/0257349 A1* | 9/2017 | Roberts-Hoffman | |
| | | | H04L 67/1061 |
| 2018/0034792 A1* | 2/2018 | Gupta | G06F 21/602 |

OTHER PUBLICATIONS

Final Office Action, U.S. Appl. No. 15/635,548, filed Oct. 8, 2020, 53 pages.
Non-Final Office Action, U.S. Appl. No. 15/635,548, filed Apr. 2, 2019, 25 pages.
Non-Final Office Action, U.S. Appl. No. 15/635,548, filed Mar. 30, 2020, 39 pages.

* cited by examiner

MULTI-KEY CRYPTOGRAPHIC MEMORY PROTECTION

CROSS-REFERENCE TO RELATED APPLICATIONS

The present patent application is a continuation application claiming priority from U.S. patent application Ser. No. 15/635,548, filed Jun. 28, 2017, and titled "Multi-Key Cryptographic Memory Protection", which is incorporated herein by reference in its entirety.

FIELD OF THE SPECIFICATION

This disclosure relates in general to the field of computer security, and more particularly, though not exclusively, to cryptographic memory protection.

BACKGROUND

The increasing demand for robust computer security has led to widespread use of cryptography in mainstream computer systems and networks. For example, disk encryption can be used to protect data residing on a persistent disk storage device, while network encryption can be used to protect data transmitted over a network. Data residing in system memory, however, is often stored and/or transmitted in plaintext and thus may be vulnerable to attacks.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
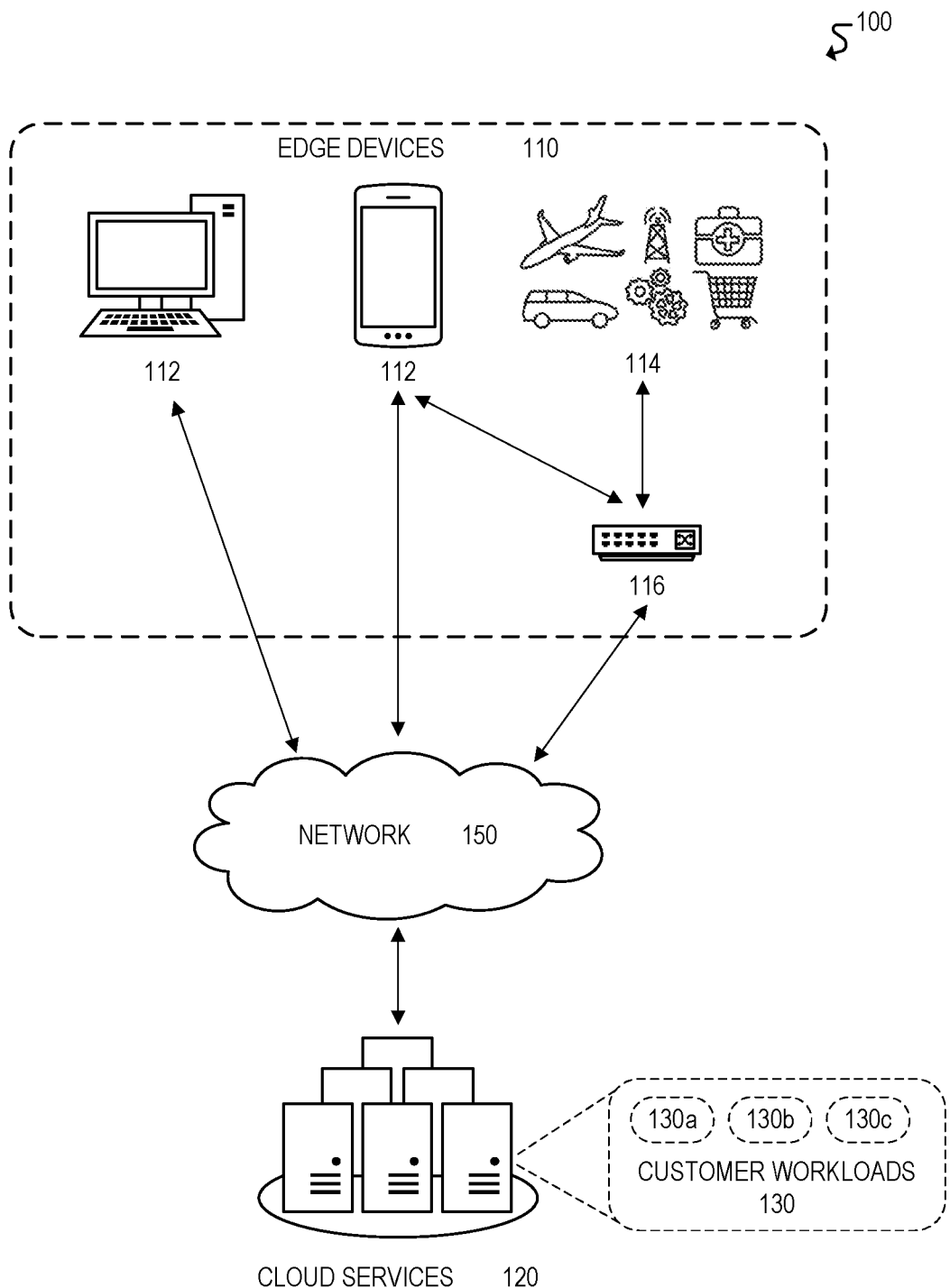
FIG. 1 illustrates a schematic diagram of an example computing system in accordance with certain embodiments.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

The increasing demand for robust computer security has led to widespread use of cryptography in mainstream computer systems and networks, along with the development of increasingly sophisticated and secure modem cryptography techniques. For example, disk encryption can be used to protect data residing on a persistent disk storage device, while network encryption can be used to protect data transmitted over a network. Data residing in system memory, however, is often stored and/or transmitted in plaintext and thus may be vulnerable to attacks. For example, attackers can use a variety of techniques to maliciously access data stored in memory, such as bus scanning and/or memory scanning, among other examples. Moreover, in some cases, these malicious techniques could be used to access memory locations containing encryption keys that are stored in plaintext, such as encryption keys used for disk encryption, thus facilitating further unauthorized access to other data that is protected by encryption.

Accordingly, this disclosure describes various embodiments of cryptographic memory protection. The described embodiments can be used to provide memory encryption protection, thus providing an additional layer of security by plugging the hole associated with unprotected or insecure memory. For example, in some embodiments, memory encryption may be provided by implementing a cryptographic engine or controller on the memory path or memory bus. In this manner, data can be encrypted and protected while residing in memory and during transmission to and from memory (e.g., when transmitted from memory to a processor, and vice versa, via the memory bus or memory path). However, while memory encryption may be a necessity for certain users and/or use cases, uniform memory protection across a computing system may be insufficient in certain circumstances. For example, a cloud service provider often hosts data and/or applications—or workloads—for multiple customers or third parties. Moreover, the cloud service provider could use memory encryption to provide uniform protection of all hosted customer workloads, for example, using a single encryption key. However, simply providing uniform memory encryption protection for all hosted workloads—without differentiating between the workloads of different customers—may be insufficient. For example, a cloud service provider and/or its customers may be averse to sharing the same encryption key for all customers. Rather, the cloud service provider and/or its customers may prefer to have memory encryption provided on a per-tenant basis (e.g., per customer or per virtual machine) to ensure that each customer workload is separately protected and isolated using a unique encryption key.

Accordingly, the described embodiments provide memory encryption that supports multiple keys and is configurable or programmable. The number of supported keys, for example, can be implementation-dependent. In some embodiments, for example, a memory protection engine can be configured or programmed (e.g., by software) to encrypt different regions or pages of memory using different encryption keys and/or algorithms. For example, in some embodiments, a user or tenant (e.g., a cloud service provider or customer) can designate a protection mode for a particular region or page of memory as either plaintext (e.g., unencrypted), standard or default encryption protection (e.g., encrypted using a default or global encryption key), or custom encryption protection (e.g., encrypted using a unique encryption key). In this manner, memory encryption can be provided and configured separately for different tenants, customers, or protection domains. In some embodiments, for example, a "domain" may be viewed as a collection of resources associated with a particular workload, which may include any regions of memory containing data associated with the workload. Moreover, memory encryption can be configured separately for each domain, thus allowing each domain or workload to be protected using a separate encryption key. In this manner, cryptographic isolation can be achieved for workloads of different tenants, customers, or users. Moreover, the workloads can also be isolated from management software (e.g., of a cloud service provider), such as a virtual machine manager. Domains can also be configured in plaintext mode, as it may be undesirable in certain circumstances to perform memory encryption for a particular domain (e.g., to avoid performance impacts of memory encryption, share memory (and I/O) between different entities, reclaim memory, and so forth).

The described embodiments can also be used to protect data when using memory for persistent data storage, such as storage class memory (SCM) and other forms of flash and solid-state storage (e.g., non-volatile dual in-line memory modules (NVDIMM), direct access storage (DAS) memory, and so forth). For example, when persistent data storage is provided using memory rather than disk-based storage, disk encryption software may be unable to adequately protect the stored data if memory encryption is not supported. Accordingly, the described embodiments may be used to protect data using memory encryption when memory is used for persistent data storage.

The described embodiments provide numerous features and advantages, including cryptographic memory protection (e.g., via a cryptographic engine on the memory path), multi-key encryption support, and software programmable configurability and flexibility. These features enable isolated encryption protection using separate keys for different domains, memory regions, workloads, tenants, and/or customers, thus providing support for multiple cryptographically-isolated protection domains. In this manner, the described embodiments can be used to satisfy heightened security requirements for certain users and/or use cases, such as cloud service providers with hosted workloads of multiple third-parties or customers. The described embodiments can also be used to leverage the performance benefits of using memory for persistent data storage (e.g., NVDIMM or other storage class memory (SCM)) without sacrificing security.

Moreover, the described memory encryption embodiments can be implemented using a generic CPU-centric approach that is compatible with any type of memory, including both volatile memory (e.g., random access memory (RAM) such as dynamic RAM (DRAM), synchronous dynamic RAM (SDRAM), and static RAM (SRAM)) and non-volatile memory (e.g., storage class memory (SCM), direct access storage (DAS) memory, non-volatile dual in-line memory modules (NVDIMM), and/or other forms of flash or solid-state storage).

The described embodiments are also scalable, as they can be implemented using instructions, commands, parameters, and/or data structures (e.g., encryption key tables) that can be extended in the future as desired. For example, the described embodiments could be scaled to provide multi-domain memory encryption for a computing system with 64 terabytes (TB) of addressable physical memory. Moreover, the described embodiments could be scaled even further, for example, through extensions to physical addresses (PAs) and/or cache tagging.

Example embodiments that may be used to implement the features and functionality of this disclosure will now be described with more particular reference to the attached FIGURES.

FIG. 1 illustrates a schematic diagram of an example computing system 100. In various embodiments, system 100 and/or its underlying components may include the cryptographic memory protection functionality described throughout this disclosure. For example, a cloud service provider 120 often hosts workloads 130 (e.g., data and/or applications) for multiple customers or third parties. Accordingly, in some embodiments, a cloud service provider 120 may implement multi-key cryptographic memory protection to provide memory encryption on a per-tenant basis, thus ensuring that each customer workload 130 is separately protected and isolated using a unique encryption key. Cryptographic memory protection can also be implemented by other components of system 100, such as edge devices 110. Example embodiments of cryptographic memory protection are described further throughout this disclosure in connection with the remaining FIGURES.

The various components in the illustrated example of computing system 100 will now be discussed further below.

Edge devices 110 may include any equipment and/or devices deployed or connected near the "edge" of a communication system 100. In the illustrated embodiment, edge devices 110 include end-user devices 112 (e.g., desktops, laptops, mobile devices), Internet-of-Things (IoT) devices 114, and gateways and/or routers 116, among other examples. Edge devices 110 may communicate with each other and/or with other remote networks and services (e.g., cloud services 120) through one or more networks and/or communication protocols, such as communication network 150. Moreover, in some embodiments, certain edge devices 110 may include the cryptographic memory protection functionality described throughout this disclosure.

End-user devices 112 may include any device that enables or facilitates user interaction with computing system 100, including, for example, desktop computers, laptops, tablets, mobile phones and other mobile devices, and wearable devices (e.g., smart watches, smart glasses, headsets), among other examples.

IoT devices 114 may include any device capable of communicating and/or participating in an Internet-of-Things (IoT) system or network. IoT systems may refer to new or improved ad-hoc systems and networks composed of multiple different devices (e.g., IoT devices 114) interoperating and synergizing for a particular application or use case. Such ad-hoc systems are emerging as more and more products and equipment evolve to become "smart," meaning they are controlled or monitored by computer processors and are capable of communicating with other devices. For example, an IoT device 114 may include a computer processor and/or communication interface to allow interoperation with other components of system 100, such as with cloud services 120 and/or other edge devices 110. IoT devices 114 may be "greenfield" devices that are developed with IoT capabilities from the ground-up, or "brownfield" devices that are created by integrating IoT capabilities into existing legacy devices that were initially developed without IoT capabilities. For example, in some cases, IoT devices 114 may be built from sensors and communication modules integrated in or attached to "things," such as equipment, toys, tools, vehicles, living things (e.g., plants, animals, humans), and so forth. Alternatively, or additionally, certain IoT devices 114 may rely on intermediary components, such as edge gateways or routers 116, to communicate with the various components of system 100.

IoT devices 114 may include various types of sensors for monitoring, detecting, measuring, and generating sensor data and signals associated with characteristics of their environment. For instance, a given sensor may be configured to detect one or more respective characteristics, such as movement, weight, physical contact, biometric properties, temperature, wind, noise, light, position, humidity, radiation, liquid, specific chemical compounds, battery life, wireless signals, computer communications, and bandwidth, among other examples. Sensors can include physical sensors (e.g., physical monitoring components) and virtual sensors (e.g., software-based monitoring components). IoT devices 114 may also include actuators to perform various actions in their respective environments. For example, an actuator may be used to selectively activate certain functionality, such as toggling the power or operation of a security system (e.g., alarm, camera, locks) or household appliance (e.g., audio system, lighting, HVAC appliances, garage doors), among other examples.

Indeed, this disclosure contemplates use of a potentially limitless universe of IoT devices 114 and associated sensors/actuators. IoT devices 114 may include, for example, any type of equipment and/or devices associated with any type of system 100 and/or industry, including transportation (e.g., automobile, airlines), industrial manufacturing, energy (e.g., power plants), telecommunications (e.g., Internet, cellular, and television service providers), medical (e.g., healthcare, pharmaceutical), food processing, and/or retail industries, among others. In the transportation industry, for example, IoT devices 114 may include equipment and devices associated with aircrafts, automobiles, or vessels, such as navigation systems, autonomous flight or driving systems, traffic sensors and controllers, and/or any internal mechanical or electrical components that are monitored by sensors (e.g., engines). IoT devices 114 may also include equipment, devices, and/or infrastructure associated with industrial manufacturing and production, shipping (e.g., cargo tracking), communications networks (e.g., gateways, routers, servers, cellular towers), server farms, electrical power plants, wind farms, oil and gas pipelines, water treatment and distribution, wastewater collection and treatment, and weather monitoring (e.g., temperature, wind, and humidity sensors), among other examples. IoT devices 114 may also include, for example, any type of "smart" device or system, such as smart entertainment systems (e.g., televisions, audio systems, videogame systems), smart household or office appliances (e.g., heat-ventilation-air-conditioning (HVAC) appliances, refrigerators, washers and dryers, coffee brewers), power control systems (e.g., automatic electricity, light, and HVAC controls), security systems (e.g., alarms, locks, cameras, motion detectors, fingerprint scanners, facial recognition systems), and other home automation systems, among other examples. IoT devices 114 can be statically located, such as mounted on a building, wall, floor, ground, lamppost, sign, water tower, or any other fixed or static structure. IoT devices 114 can also be mobile, such as devices in vehicles or aircrafts, drones, packages (e.g., for tracking cargo), mobile devices, and wearable devices, among other examples. Moreover, an IoT device 114 can also be any type of edge device 110, including end-user devices 112 and edge gateways and routers 116.

Edge gateways and/or routers 116 may be used to facilitate communication to and from edge devices 110. For example, gateways 116 may provide communication capabilities to existing legacy devices that were initially developed without any such capabilities (e.g., "brownfield" IoT devices). Gateways 116 can also be utilized to extend the geographical reach of edge devices 110 with short-range, proprietary, or otherwise limited communication capabilities, such as IoT devices 114 with Bluetooth or ZigBee communication capabilities. For example, gateways 116 can serve as intermediaries between IoT devices 114 and remote networks or services, by providing a front-haul to the IoT devices 114 using their native communication capabilities (e.g., Bluetooth, ZigBee), and providing a back-haul to other networks 150 and/or cloud services 120 using another wired or wireless communication medium (e.g., Ethernet, Wi-Fi, cellular). In some embodiments, a gateway 116 may be implemented by a dedicated gateway device, or by a general purpose device, such as another IoT device 114, end-user device 112, or other type of edge device 110.

In some instances, gateways 116 may also implement certain network management and/or application functionality (e.g., IoT management and/or IoT application functionality for IoT devices 114), either separately or in conjunction with other components, such as cloud services 120 and/or other edge devices 110. For example, in some embodiments, configuration parameters and/or application logic may be pushed or pulled to or from a gateway device 116, allowing IoT devices 114 (or other edge devices 110) within range or proximity of the gateway 116 to be configured for a particular IoT application or use case.

Cloud services 120 may include services that are hosted remotely over a network 150, or in the "cloud." In some embodiments, for example, cloud services 120 may be remotely hosted on servers in datacenter (e.g., application servers or database servers). Cloud services 120 may include any services that can be utilized by or for edge devices 110, including but not limited to, data and application hosting, computational services (e.g., data analytics, searching, diagnostics and fault management), security services (e.g., surveillance, alarms, user authentication), mapping and navigation, geolocation services, network or infrastructure management, IoT application and management services, payment processing, audio and video streaming, messaging, social networking, news, and weather, among other examples. Moreover, in some embodiments, certain cloud services 120 may include the cryptographic memory protection functionality described throughout this disclosure. For example, a cloud service provider 120 often hosts workloads 130 (e.g., data and/or applications) for multiple customers or third parties. Accordingly, in some embodiments, a cloud service provider 120 may implement multi-key cryptographic memory protection to provide memory encryption on a per-tenant basis, thus ensuring that each customer workload 130 is separately protected and isolated using a unique encryption key.

Network 150 may be used to facilitate communication between the components of computing system 100. For example, edge devices 110, such as end-user devices 112 and IoT devices 114, may use network 150 to communicate with each other and/or access one or more remote cloud services 120. Network 150 may include any number or type of communication networks, including, for example, local area networks, wide area networks, public networks, the Internet, cellular networks, Wi-Fi networks, short-range networks (e.g., Bluetooth or ZigBee), and/or any other wired or wireless networks or communication mediums.

Any, all, or some of the computing devices of system 100 may be adapted to execute any operating system, including Linux or other UNIX-based operating systems, Microsoft Windows, Windows Server, MacOS, Apple iOS, Google Android, or any customized and/or proprietary operating system, along with virtual machines adapted to virtualize execution of a particular operating system.

While FIG. 1 is described as containing or being associated with a plurality of elements, not all elements illustrated within system 100 of FIG. 1 may be utilized in each alternative implementation of the present disclosure. Additionally, one or more of the elements described in connection with the examples of FIG. 1 may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Multi-Key Cryptographic Memory Protection

Figure 2:
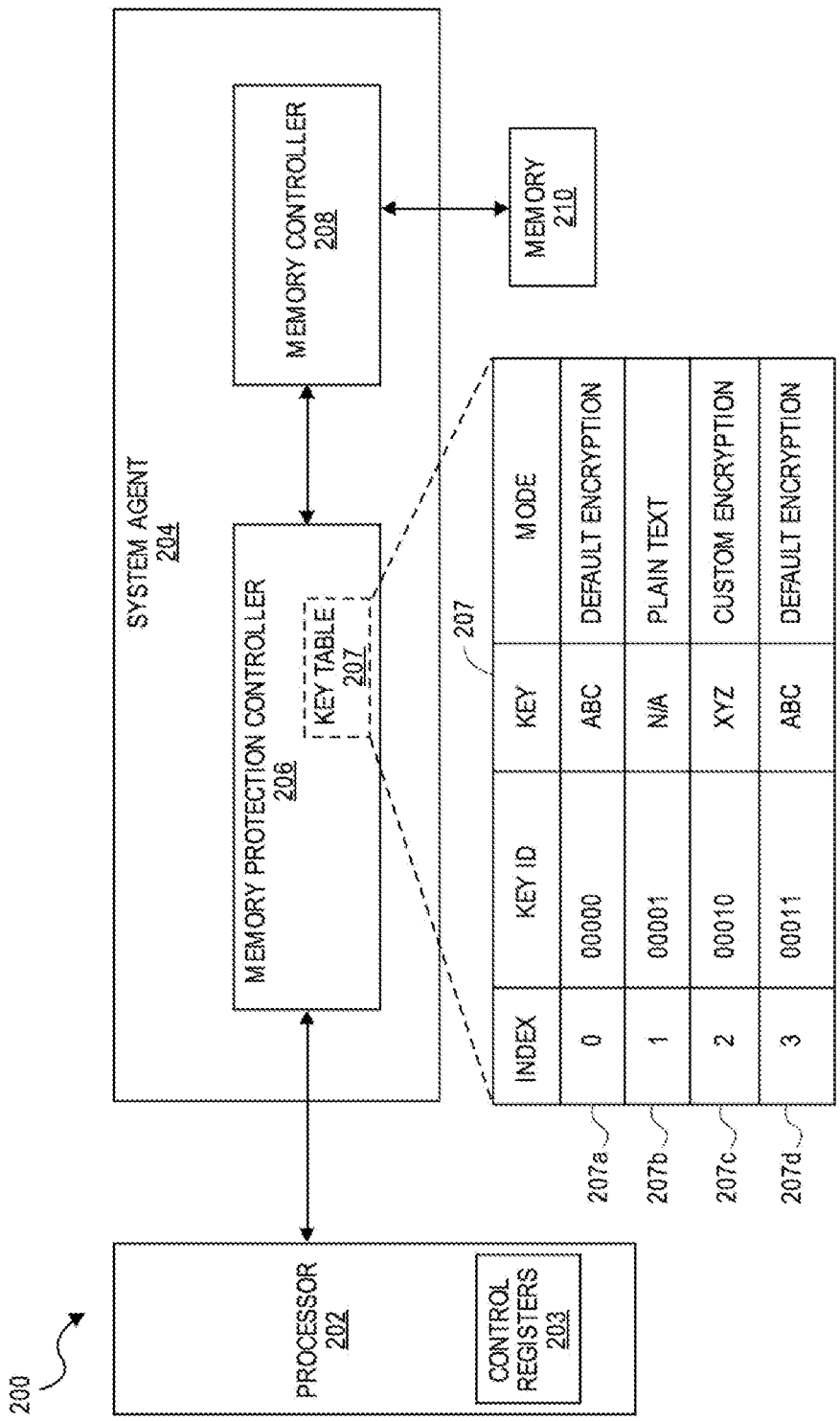
FIG. 2 illustrates an example embodiment of a multi-key cryptographic memory protection system.

FIG. 2 illustrates an example embodiment of a multi-key cryptographic memory protection system 200. In the illustrated embodiment, memory protection system 200 includes processor 202, system agent 204, and memory 210. As described further below, memory protection system 200 provides cryptographic protection of data stored on memory 210.

Processor 202 may be used to execute instructions, code, and/or any other form of logic or software, such as instructions associated with a software application. Processor 202 may include any combination of logic or processing elements operable to execute instructions, whether loaded from memory or implemented directly in hardware, such as a microprocessor, digital signal processor, field-programmable gate array (FPGA), graphics processing unit (GPU), programmable logic array (PLA), or application-specific integrated circuit (ASIC), among other examples. In some embodiments, for example, processor 202 and/or memory protection system 200 may be implemented using the computer architectures of FIGS. 6-10.

Memory 210 may be used to store information, such as code and/or data used by processor 202 during execution, and/or persistent data associated with an application or user of system 200. Memory 210 may include any type or combination of components capable of storing information, including volatile memory (e.g., random access memory (RAM), such as dynamic RAM (DRAM), synchronous dynamic RAM (SDRAM), and static RAM (SRAM)) and/or non-volatile memory (e.g., storage class memory (SCM), direct access storage (DAS) memory, non-volatile dual in-line memory modules (NVDIMM), and/or other forms of flash or solid-state storage).

System agent 204 may be used to provide various functions for processor 202, such as managing access to memory 210 and/or other resources of system 200. In the illustrated embodiment, for example, system agent 204 includes a memory controller 208 to control and/or manage access to memory 210 of system 200. Moreover, as described further below, system agent 204 also includes a memory protection controller 206 to protect data stored on memory 210. In some embodiments, system agent 204 may also provide an interface between processor 202 and other components of system 200 (e.g., using a direct media interface (DMI) and/or PCI-Express bridge). In various embodiments, system agent 204 may include any combination of logic elements configured to perform functionality of system agent 204 described herein, whether loaded from memory or other non-transitory computer readable medium, or implemented directly in hardware, including by way of non-limiting examples: a microprocessor, digital signal processor (DSP), field-programmable gate array (FPGA), graphics processing unit (GPU), programmable logic array (PLA), application-specific integrated circuit (ASIC), and/or virtual machine (VM) processor. System agent 204 may be integrated with processor 202, or alternatively, system agent 204 may be implemented on a separate chip communicatively coupled or connected to processor 202.

Memory controller 208 may be used to control and/or manage access to memory 210 of system 200. In various embodiments, memory controller 208 may be implemented using any combination of hardware and/or software logic, including a microprocessor, application-specific integrated circuit (ASIC), field-programmable gate array (FPGA), programmable logic array (PLA), virtual machine (VM), and/or any other type of circuitry or logic.

In the illustrated embodiment, system 200 provides cryptographic memory protection for memory 210. In some embodiments, for example, cryptographic memory protection may be implemented by extending and/or modifying a particular computer architecture. For example, cryptographic memory protection may be implemented by extending the functionality of a processor 202 and/or introducing a memory protection controller 206. In the illustrated embodiment, for example, processor 202 is extended to support control registers 203 and processor instruction(s) that can be used to enable and/or configure cryptographic memory protection, and memory protection controller 206 is implemented to provide the cryptographic memory protection. Although the illustrated example uses separate logical blocks to depict memory protection controller 206 and processor 202, in actual embodiments memory protection controller 206 and processor 202 may be integrated together or alternatively may be implemented as separate components. In various embodiments, for example, memory protection controller 206 may be implemented using any combination of hardware and/or software logic, including a microprocessor, application-specific integrated circuit (ASIC), field-programmable gate array (FPGA), programmable logic array (PLA), virtual machine (VM), and/or any other type of circuitry or logic.

Memory protection controller 206 uses memory encryption to protect data stored on memory 210. In some embodiments, for example, memory protection controller 206 may be implemented on the memory path or memory bus to allow encryption of data transmitted to and from, and/or stored on, memory 210. Moreover, in some embodiments, memory protection controller 206 may be configurable or programmable, and may include support for multiple encryption keys. Accordingly, memory protection controller 206 may be configured or programmed (e.g., by software) to encrypt different regions or pages of memory 210 using different encryption keys and/or algorithms. In this manner, memory encryption can be provided and configured separately for different users, tenants, customers, applications, and/or workloads.

For example, in some embodiments, memory protection controller 206 may be used to define various secured or protected domains that can be separately configured and protected using memory encryption. In some embodiments, for example, a "domain" may be viewed as a collection of resources associated with a particular workload (e.g., a workload of a particular user or application), and may include any regions of memory containing data associated with the workload. For example, a protected domain for a customer workload of a cloud service provider may include resources (e.g., memory) associated with an operating system (O/S), virtual machine (VM) (e.g., a VM running on a virtual machine manager (VMM)), and/or any ring-3 applications running on the O/S or VM. Memory protection controller 206 may allow the protected domains to be configured and protected separately, thus allowing each protected domain to be cryptographically isolated in memory by encrypting its associated code and/or data with a unique encryption key. In this manner, the workloads of different users, customers, and/or tenants can be cryptographically isolated by defining different protection domains for the various workloads.

In some embodiments, the cryptographic memory protection of system 200 may be discovered and configured using processor instructions and/or hardware registers. For example, in some embodiments, a processor instruction may be used to determine whether cryptographic memory protection is supported by system 200, such as a CPU identification (CPUID) instruction used by software to identify the capabilities of a particular processor.

Upon determining that cryptographic memory protection is supported by system 200, the cryptographic memory protection may then be enabled and/or configured using hardware registers, such as control registers 203 of processor 202. For example, control registers 203 may include various model-specific registers (MSRs) that allow software to discover, enable, and/or configure the cryptographic memory protection capabilities of system 200. In some embodiments, for example, control registers 203 may include a memory encryption capability register, a memory encryption activation register, and/or one or more memory encryption exclusion registers, as described further below.

The memory encryption capability register (ME_CAPABILITY_MSR) may be used to allow software to discover the memory encryption capabilities of system 200. For example, software can read the ME_CAPABILITY_MSR (e.g., using a read MSR (RDMSR) instruction) to identify the supported encryption types and/or algorithms, the maximum number of encryption keys that can be used concurrently, and so forth. TABLE 1 illustrates an example embodiment of the memory encryption capability register (ME_CAPABILITY_MSR).

TABLE 1

Memory Encryption Capability Register (ME_CAPABILITY_MSR)

| FIELD | BIT INDEX | DESCRIPTION |
| --- | --- | --- |
| SUPPORTED ENCRYPTION ALGORITHMS | 0:15 | This field is used to identify supported encryption algorithms or encryption types. Each bit of this field (if used) corresponds to a particular encryption algorithm. For example, bit 0 may correspond to AES-XTS 128-bit encryption, bit 1 may correspond to AES-XTS 256-bit encryption, and so forth. A particular encryption algorithm is supported if the corresponding bit has a value of 1, and is unsupported if the corresponding bit has a value of 0. |
| RESERVED | 16:31 | These bits are unused and/or reserved (e.g., reserved for functionality extensions and/or other purposes). |
| MAX # OF KEY ID BITS (ME_MAX_KEYID_BITS) | 32:35 | This field is used to identify the maximum number of bits that can be used for key identifiers. More specifically, the value of this bit field represents the maximum number of higher order bits of a memory address that can be used as a key or domain identifier for memory encryption. For example, if this field has a value of 8 (binary 1000), the higher order 8 bits of a memory address can be used as a key identifier, thus supporting a total of 256 keys ($2^8 = 256$). Since this is a four-bit field, the maximum value is 15 (binary 1111), which allows support for up to ~32k keys ($2^{15} = 32,768$). |
| MAX # OF KEYS (ME_MAX_KEYS) | 36:50 | The value of this field is 0 if multi-key memory encryption is not supported. The value of this field represents the maximum number of encryption keys that can be used for memory encryption. This field can be used to specify a maximum number of keys that is less than the total number of supported keys (as specified by the ME_MAX_KEYID_BITS field above (bits 32:35)). For example, if the above ME_MAX_KEYID_BITS field has a value of 8, the total number of supported keys is 256 ($2^8 = 256$). However, if the present field (ME_MAX_KEYS) has a value of 200, then only 200 keys of the 256 total supported keys can be used. The value of this field is 0 if multi-key memory encryption is not supported. |
| RESERVED | 51:63 | These bits are unused and/or reserved (e.g., reserved for functionality extensions and/or other purposes). |

The memory encryption activation register (ME_ACTIVATE_MSR) may be used to activate the cryptographic memory protection of system 200 (e.g., by setting the appropriate values in the register fields). TABLE 2 illustrates an example embodiment of the memory encryption activation register (ME_ACTIVATE_MSR).

TABLE 2

Memory Encryption Activation Register (ME_ACTIVATE_MSR)

| FIELD | BIT INDEX | DESCRIPTION |
|---|---|---|
| READ-ONLY LOCK | 0 | This field is used to activate a read-only lock on the memory encryption configuration registers after memory encryption has been activated.<br>For example, the lock may be activated after memory encryption has been activated through a write to the ME_ACTIVATE_MSR register (e.g., using a write MSR or WRMSR instruction). The lock can be enabled by setting this bit field to 1, and the lock can be disabled by setting this bit field to 0.<br>The lock is applied to the ME_ACTIVATE_MSR, ME_EXCLUDE_BASE_MSR, and ME_EXCLUDE_MASK_MSR registers. Any writes to these registers will be ignored while the lock is active.<br>The lock is reset when the processor is reset. |
| ENABLE MEMORY ENCRYPTION | 1 | This field is used to enable or disable memory encryption. Memory encryption is enabled when this bit field has a value of 1, and is disabled when this bit field has a value of 0. |
| KEY SELECTION FOR DEFAULT MODE | 2 | This field is used to select a key to be used for default encryption mode. Memory regions protected using default encryption mode, for example, are protected uniformly using a default encryption algorithm and key.<br>If this bit field is set to 0, a new key is created (e.g., after a cold or warm boot).<br>If this bit field is set to 1, an existing key is restored from storage (e.g., after resuming from standby). |
| SAVE KEY FOR STANDBY | 3 | This field is used to specify whether the key used for default encryption mode should be saved in order to allow the key to be restored after resuming from standby.<br>If this bit field is set to 1, the key is saved. If this bit field is set to 0, the key is not saved. |
| ENCRYPTION ALGORITHM FOR DEFAULT MODE | 4:7 | This field can be used to specify the encryption algorithm to use for default encryption mode.<br>The value of this field identifies the bit index in the ME_CAPABILITY_MSR register that corresponds to the selected encryption algorithm.<br>For example, the supported encryption algorithms are identified by bits 0:15 of the ME_CAPABILITY_MSR register. For example, bit index 0 of the ME_CAPABILITY_MSR register may correspond to AES-XTS 128-bit encryption, bit index 1 may correspond to AES-XTS 256-bit encryption, and so forth.<br>If the present field has a value of 0 (binary 0000), the encryption algorithm corresponding to bit index 0 of the ME_CAPABILITY_MSR register is selected, which would be AES-XTS 128-bit encryption.<br>If the present field has a value of 1 (binary 0001), the encryption algorithm corresponding to bit index 1 of the ME_CAPABILITY_MSR register is selected, which would be AES-XTS 256-bit encryption.<br>The encryption algorithm selected using this field must be supported (e.g., its corresponding bit index in the ME_CAPABILITY_MSR register must be set to 1). |
| RESERVED | 8:31 | These bits are unused and/or reserved (e.g., reserved for functionality extensions and/or other purposes). |
| # OF KEY ID BITS (ME_KEYID_BITS) | 32:35 | This field is used to identify the number of bits that are used for key identifiers.<br>More specifically, the value of this field represents the number of higher order bits of a memory address that are used as a key or domain identifier for memory encryption. This field can be used to specify a number of bits for key identifiers that is less than the maximum number of available bits for key identifiers (as specified by the ME_MAX_KEYID_BITS field (bits 32:35) of the ME_CAPABILITY_MSR register).<br>For example, if the present field has a value of 8 (binary 1000), the higher order 8 bits of a memory address are used as the key identifier, thus supporting a total of 256 keys ($2^8 = 256$).<br>The value of this field is 0 if multi-key memory encryption is disabled. If multi-key memory encryption is disabled, but memory encryption in general is enabled (e.g., bit 1 of ME_ACTIVATE_MSR is set), then only default encryption mode is enabled (and custom or multi-key encryption is disabled). |

TABLE 2-continued

Memory Encryption Activation Register (ME_ACTIVATE_MSR)

| FIELD | BIT INDEX | DESCRIPTION |
|---|---|---|
| RESERVED | 36:47 | These bits are unused and/or reserved (e.g., reserved for functionality extensions and/or other purposes). |
| ENCRYPTION RESTRICTION BITMASK | 48:63 | This field can be used to restrict the encryption algorithms that can be used for multi-key encryption.<br>For example, the supported encryption algorithms are identified in the ME_CAPABILITY_MSR register (bits 0:15). The bits in the present field correspond to the bits of the ME_CAPABILITY_MSR register that are used to identify the supported encryption algorithms. In this manner, a supported encryption algorithm can be restricted from being used for multi-key encryption by clearing the corresponding bit in the present field (or alternatively, setting the corresponding bit). |

The memory encryption exclusion registers (ME_EXCLUDE_BASE_MSR and ME_EXCLUDE_MASK_MSR) may be used to exclude certain memory regions from the cryptographic memory protection provided by system 200. For example, in some embodiments, the exclusion registers may be used to identify a base memory address, and memory encryption may then be bypassed for memory addresses matching the base address (e.g., allowing the excluded or bypassed memory addresses to be accessed in plaintext mode).

TABLE 3 illustrates an example embodiment of the memory encryption exclusion mask register (ME_EXCLUDE_MASK_MSR), and TABLE 4 illustrates an example embodiment of the memory encryption exclusion base register (ME_EXCLUDE_BASE_MSR).

TABLE 3

Memory Encryption Exclusion Mask Register (ME_EXCLUDE_MASK_MSR)

| FIELD | BIT INDEX | DESCRIPTION |
|---|---|---|
| RESERVED | 0:10 | These bits are unused and/or reserved (e.g., reserved for functionality extensions and/or other purposes). |
| ENABLE EXCLUSION | 11 | This field can be used to enable or disable exclusions from memory encryption protection.<br>When this field is set to 0, no memory addresses are excluded from memory encryption protection.<br>When this field is set to 1, the ME_EXCLUDE_MASK_MSR and ME_EXCLUDE_BASE_MSR registers are used to define a memory range that is excluded from memory encryption protection. |
| EXCLUSION MASK | 12:(MAX ADDRESS SIZE-1) | This field is used to identify the bits of a memory address that must match the EXCLUSION BASE (defined in the ME EXCLUDE_BASE_MSR register) in order to qualify as an excluded memory range.<br>For example, when accessing a particular memory address, the memory address can be AND-ed with the EXCLUSION MASK, and if the result matches the EXCLUSION BASE, memory encryption is bypassed for that memory address. |
| RESERVED | (MAX ADDRESS SIZE):63 | These bits are unused and/or reserved (e.g., reserved for functionality extensions and/or other purposes). |

TABLE 4

Memory Encryption Exclusion Base Register (ME_EXCLUDE_BASE_MSR)

| FIELD | BIT INDEX | DESCRIPTION |
|---|---|---|
| RESERVED | 0:11 | These bits are unused and/or reserved (e.g., reserved for functionality extensions and/or other purposes). |
| EXCLUSION BASE | 12:(MAX ADDRESS SIZE-1) | This field is used to identify the base memory address of a particular memory range to exclude from memory encryption protection. |

TABLE 4-continued

Memory Encryption Exclusion Base Register
(ME_EXCLUDE_BASE_MSR)

| FIELD | BIT INDEX | DESCRIPTION |
| --- | --- | --- |
| RESERVED | (MAX ADDRESS SIZE):63 | These bits are unused and/or reserved (e.g., reserved for functionality extensions and/or other purposes). |

In the illustrated embodiment, memory protection controller 206 maintains an internal domain key table 207 to identify protected domains that have been configured in system 200. The key table 207 may be implemented using any form of memory or storage (e.g., RAM), and may also be implemented directly on memory protection controller 206, in memory 210, and/or using another memory component.

The entries 207a-d of domain key table 207 each correspond to a different protected domain. For example, each entry 207a-d includes a key or domain identifier (ID), a protection mode, and an associated encryption key (if applicable). In some embodiments, for example, a key ID may represent the higher order bits of the memory addresses that are within the associated protected domain. For example, as discussed above, the ME_KEYID_BITS field of the ME_ACTIVATE_MSR register specifies the number of bits used for key IDs. In the illustrated example, each key ID in domain key table 207 is represented using 5 bits. Accordingly, the protected domain associated with a given key ID covers all memory addresses whose highest order 5 bits match the key ID. In the illustrated embodiment, the key ID is stored as a field in key table 207, but in alternative embodiments, the key ID may be used as an index into key table 207 rather than being stored directly in key table 207.

Moreover, in some embodiments, multiple protection modes may be supported, and each protected domain may be protected using a particular protection mode. For example, in some embodiments, the supported protection modes may include plaintext mode (e.g., unencrypted), standard or default encryption mode (e.g., encrypted using a standard or default encryption key), and/or custom encryption mode (e.g., encrypted using a unique encryption key). Accordingly, key table 207 may identify the protection mode associated with each protected domain or key ID.

For example, in the illustrated example, domain key table 207 includes four entries. The first entry identifies a protected domain corresponding to key ID 00000 (thus covering all memory addresses that contain 00000 in the highest order 5 bits), which is protected in default encryption mode using key "ABC." The second entry identifies a protected domain corresponding to key ID 00001 (thus covering all memory addresses that contain 00001 in the highest order 5 bits), which is protected in plaintext mode and thus does not have an associated encryption key. The third entry identifies a protected domain corresponding to key ID 00010 (thus covering all memory addresses that contain 00010 in the highest order 5 bits), which is protected in custom encryption mode using key "XYZ." The fourth entry identifies a protected domain corresponding to key ID 00011 (thus covering all memory addresses that contain 00011 in the highest order 5 bits), which is protected in default encryption mode using key "ABC." As shown by these examples, the domain protected using custom encryption mode has a unique key ("XYZ"), the domains protected using default encryption mode share an encryption key ("ABC"), and the domain protected in plaintext mode is unencrypted and thus has no associated key.

In some embodiments, protected domains may be defined and/or configured using a processor instruction implemented by processor 202, such as the "platform configuration" (PCONFIG) instruction described in connection with FIG. 3 and throughout this disclosure. The PCONFIG instruction, for example, may be used to define and/or configure a protected domain by programming a new entry—or modifying an existing entry—in key table 207 of memory protection controller 206. In this manner, protected domains can be defined and configured programmatically (e.g., by management software) using the PCONFIG instruction.

Figure 3:
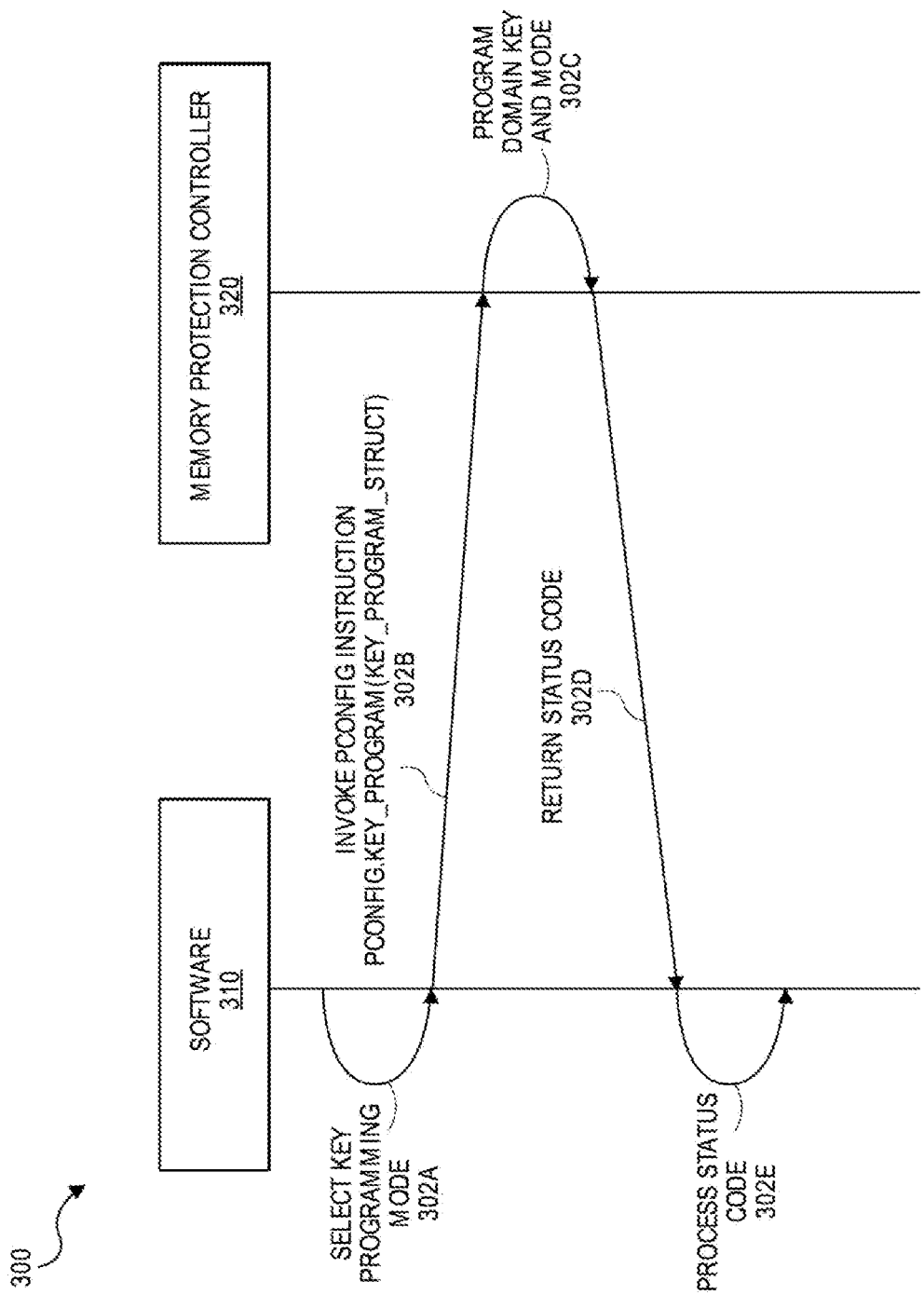
FIG. 3 illustrates an example of configuring a protected domain using a processor instruction.

FIG. 3 illustrates an example 300 of configuring a protected domain using a processor instruction. In some embodiments, for example, a processor may implement an instruction that can be used to configure the protected domains associated with a memory protection system. For example, the processor instruction could be a "platform configuration" (PCONFIG) instruction, a "trusted platform action supervisor" (TPAS) instruction, and/or any other suitable type of instruction.

A "platform configuration" (PCONFIG) instruction, for example, may be used to define and/or configure a protected domain by programming a new entry—or modifying an existing entry—in a domain key table of a memory protection controller (e.g., domain key table 207 of memory protection controller 206 from FIG. 2). In this manner, protected domains can be defined and configured programmatically using the PCONFIG instruction. Once a protected domain has been configured using the PCONFIG instruction, memory addresses associated with the protected domain are protected in the manner specified by the configuration for the protected domain. For example, when using encryption protection, data is encrypted before being written to memory addresses within the protected domain, and data read from memory addresses within the protected domain is decrypted before being returned to the requesting processor.

In some embodiments, the PCONFIG instruction may require a certain privilege level or privilege ring. For example, the processor may support a hierarchy of privilege levels or privilege rings to restrict access to certain resources. In some embodiments, privilege ring 0 may be the least restrictive level, while privilege rings with higher numbers may be increasingly more restrictive. For example, privilege ring 0 may be used for system management software (e.g., the operating system kernel and device drivers), while privilege ring 3 may be used for userland applications. Accordingly, in some embodiments, the PCONFIG instruction may be a ring-0 instruction that can only be used by software executing in the highest privilege ring (e.g., management software used to configure protected domains). Alternatively, or additionally, the PCONFIG instruction may be a ring-3 instruction that can be used by any userland application to configure its own protected domain.

FIG. 3 illustrates an example call flow 300 associated with the PCONFIG instruction. The illustrated example identifies the call flow 300 between software 310 performing domain configuration using the PCONFIG instruction and a memory protection controller 320. Memory protection controller 320 may include any engine, controller, or other component that provides cryptographic memory protection (e.g., memory protection controller 206 of FIG. 2). Software 310 may include any software used to configure the domains protected by memory protection controller 320, such as a virtual machine manager and/or other management software. The illustrated call flow begins by software 310 selecting a key programming mode for programming an encryption key for a particular domain (call 302a). For example, as discussed further below, software 310 may directly specify a key for the domain, or may request that a random key be generated. Software 310 may then invoke the PCONFIG processor instruction to perform the domain configuration (call 302b). When the PCONFIG instruction is invoked, memory protection controller 320 programs the key and protection mode for the particular domain (call 302c). Memory protection controller 320 then returns a status code to software 310 (call 302d), and the status code is then processed by software 310 (call 302e).

In some embodiments, the PCONFIG instruction may support various leaf functions for configuring and managing protected domains. When the PCONFIG instruction is executed, for example, the particular leaf function to invoke may be specified in a hardware register (e.g., the EAX register). In some embodiments, the parameters used by a particular leaf function may also be specified in hardware registers (e.g., the RBX/RCX/RDX registers).

TABLE 5 illustrates an example of PCONFIG leaf encodings that could be used to enable support for multiple leaf functions. Although only one leaf function is defined (the KEY_PROGRAM leaf), additional leaf functions can be defined using the reserved leaf encodings in order to extend the functionality of the PCONFIG instruction.

TABLE 5

PCONFIG Leaf Function Encodings

| LEAF | ENCODING | DESCRIPTION |
| --- | --- | --- |
| KEY_PROGRAM | 0x00000000 | This leaf function is used to program the key associated with a domain. |
| OTHER | 0x00000001-0xFFFFFFFF | Additional leaf functions can be defined using these reserved leaf encodings for future extensions to the functionality of the PCONFIG instruction. |

The key program leaf function (KEY_PROGRAM) of the PCONFIG instruction can be used to program a key for a protected domain. In some embodiments, the parameters used by the key program leaf function may be specified in a key program structure (KEY_PROGRAM_STRUCT), and the address of the key program structure may be specified in a hardware register (e.g., the RBX register). TABLE 6 illustrates an example embodiment of the key program structure (KEY_PROGRAM_STRUCT).

TABLE 6

Key Program Structure (KEY_PROGRAM_STRUCT)

| FIELD | SIZE (bytes) | DESCRIPTION |
| --- | --- | --- |
| KEYID | 1 | This field identifies the key ID of a domain that is being programmed. |
| KEYID_CMD | 1 | This field identifies a key programming command. |
| KEYID_ENC_ALG | 2 | This field may be used to select an encryption algorithm to use for the domain (based on the available encryption algorithms). |
| KEYID_KEY | 16 | This field may identify an encryption key for the domain. |
| KEYID_TWEAK KEY | 16 | This field may identify a tweak key value. |

As shown in TABLE 6, the key program structure identifies the key ID of the particular domain being programmed, and it also specifies a key programming command. In some embodiments, for example, the key program leaf function may support multiple key programming commands, and the desired command may be specified in the key program structure. Moreover, in some embodiments, the key program structure may also include reserved field(s) that can be used for subsequent extensions to the key program leaf function.

TABLE 7 illustrates examples of key programming commands that may be supported by the key program leaf function.

TABLE 7

Key Programming Commands

| KEY DOMAIN (KD) COMMAND | ENCODING | DESCRIPTION |
| --- | --- | --- |
| Set Key Direct (KD_SET_KEY_DIRECT) | 0 | This command sets the key for a domain directly using the key specified in the key program structure (KEY_PROGRAM_STRUCT). The key is provided by the software that initiates this key programming command. The domain is then protected in custom encryption mode. |
| Set Key Random (KD_SET_KEY_RANDOM) | 1 | This command sets the key for a domain using a randomly generated key. For example, a key may be randomly generated by a processor and/or a random number generator, and thus may not be known by (or shared with) the software that initiates the key programming command. The domain is then protected in custom encryption mode. |

TABLE 7-continued

Key Programming Commands

| KEY DOMAIN (KD) COMMAND | ENCODING | DESCRIPTION |
|---|---|---|
| Clear Key (KD_CLEAR_KEY) | 2 | This command clears the key that was previously set for a domain. The domain is then protected in default encryption mode. |
| No Key (KD_NO_KEY) | 3 | This command disables memory encryption for a domain. The domain is then protected in plaintext mode. |

After the key program leaf function is executed, a return value or status code may be specified in a hardware register to indicate whether the key program function was successful. TABLE 8 illustrates examples of the status codes that may be returned by the key program leaf function.

TABLE 8

Status codes returned by key program leaf function (KEY_PROGRAM)

| STATUS CODE | ENCODING | DESCRIPTION |
|---|---|---|
| PROG_SUCCESS | 0 | The domain is programmed successfully. |
| INVALID_PROG_CMD | 1 | The key programming command is invalid. |
| ENTROPY_ERROR | 2 | The entropy of a randomly generated key is insufficient. |
| INVALID_KEYID | 3 | The domain key ID is invalid. |
| INVALID_ENC_ALG | 4 | An invalid encryption algorithm is selected. |
| DEVICE_BUSY | 5 | A lock for the domain key table cannot be obtained. |

While the illustrated embodiment uses the PCONFIG processor instruction to perform domain configuration, other embodiments may use alternative and/or additional approaches for domain configuration. For example, in some embodiments, domain configuration may be performed using hardware registers. For example, a PCONFIG model-specific register (MSR) may be implemented for performing domain configuration, allowing software to invoke the PCONFIG operation by writing to the PCONFIG MSR (e.g., executing a WRMSR instruction with the index for the PCONFIG MSR passed in a register, such as the ECX register). Moreover, certain parameters for the PCONFIG operation (and its associated leaf functions and commands) may be passed in hardware registers. For example, the address of the key program structure (KEY_PROGRAM_STRUCT) can be passed in a hardware register, such as the EDX register, EAX register, or both of those registers (e.g., for 64-bit memory addresses). The PCONFIG operation can then be performed in a similar manner as described above.

Moreover, in some embodiments, a PCONFIG operation may utilize wrapped blobs for domain key programming. In this manner, domain keys can be programmed without revealing the keys to management software. In some embodiments, for example, additional PCONFIG leaf functions may be implemented to enable keys to be wrapped and then subsequently programmed to memory protection controller 320 after being unwrapped.

Example pseudocode for implementing the PCONFIG instruction is provided below: // #UD (undefined opcode exception) if PCONFIG is not enumerated or in VM86, or CPL>0 if (CPUID.7.0:ECX[PCONFIG]==0 OR RFLAGS.VM==1 OR CPL>0) #UD;

```
if (in VMX non-root mode)
{
  if (VMCS.PCONFIG)
  {
    if ((EAX>62 AND VMCS.PCONFIG_EXITING[63]
        ==1) OR
        (EAX<63 AND VMCS.PCONFIG_EXITING
        [EAX]==1))
    {
      Set VMCS.EXIT_REASON=PCONFIG; //No Exit
        qualification
      Deliver VMEXIT;
    }
  }
  else
  {
    #UD
  }
}
// #GP(0) (general protection fault) for an unsupported
   leaf
if(EAX !=0) #GP(0)
// KEY_PROGRAM leaf flow
if (EAX==0)
{
// #GP(0) if ME_ACTIVATE_MSR is not locked or does
   not enable memory encryption (ME) or multiple keys
   are not enabled
if (ME_ACTIVATE_MSR.LOCK !=1 OR ME_ACTI-
   VATE_MSR.ENABLE  !=1  OR  ME_ACTI-
   VATE_MSR.ME_KEYID_BITS==0) #GP(0)
// Check KEY_PROGRAM_STRUCT is 256B aligned
if(DS:RBX is not 256B aligned) #GP(0);
// Check that KEY_PROGRAM_STRUCT is read
   accessible
<<DS: RBX should be read accessible>>
// Copy KEY_PROGRAM_STRUCT to a temporary
   variable
TMP_KEY_PROGRAM_STRUCT=DS:RBX.*;
// RSVD field check
if(TMP_KEY_PROGRAM_STRUCT.RSVD    !=0)
   #GP(0);
if(TMP_KEY_PROGRAM_STRUC-
   T.USUPP_KEYID_KEY.BYTES[63:16]!=0)  #GP
   (0);
if(TMP_KEY_PROGRAM_STRUC-
   T.USUPP_KEYID_TWEAK_KEY.BYTES[63:
   16]
!=0)
#GP(0);
```

```
// Check for a valid command
if(TMP_KEY_PROGRAM_STRUCT.  KEYID_CMD.
    COMMAND is not a valid command)
{
  RFLAGS.ZF=1;
  RAX=INVALID_PROG_CMD;
    goto EXIT;
}
// Check that the KEYID being operated upon is a valid
    KEYID
if(TMP_KEY_PROGRAM_STRUCT.KEYID>
2^ME_ACTIVATE_MSR.ME_KEYID_BITS-1
OR TMP_KEY_PROGRAM_STRUCT.KEYID>
ME_CAPABILITY_MSR.ME_MAX_KEYS
OR TMP_KEY_PROGRAM_STRUCT.KEYID==0)
{
RFLAGS.ZF=1;
  RAX=INVALID_KEYID;
    goto EXIT;
}
// Check that only one algorithm is requested for the
    KEYID domain and it is one of the activated algorithms
if(NUM_BITS(TMP_KEY_PROGRAM_
    STRUCT.KEYID_CMD.ENC_ALG) !=1||
(TMP_KEY_PROGRAM_STRUCT.KEYID_CMD.EN-
    C_ALG &
ME_ACTIVATE_MSR.ME_ALG_ENABLE==0))
{
RFLAGS.ZF=1;
  RAX=INVALID_ENC_ALG;
    goto EXIT;
}
// Try to acquire exclusive lock
if (NOT KEY_TABLE_LOCK.ACQUIRE(WRITE))
{
  // PCONFIG failure
  RFLAGS.ZF=1;
  RAX=DEVICE_BUSY;
    goto EXIT;
}
// Lock is acquired
switch(TMP_KEY_PROGRAM_STRUCT.
    KEYID_CMD.COMMAND)
{
case KD_SET_KEY_DIRECT:
  <<Write
KEY=TMP_KEY_PROGRAM_STRUCT.USUPP_
    KEYID_KEY,
TWEAK_KEY=TMP_KEY_PROGRAM_STRUCT.
    USUPP_KEYID_TWEAK_KEY,
KEY_CONTROL=2'b01,
to ME Key table at index TMP_KEY_PROGRAM_
    STRUCT.KEYID
>>
// Do a read to guarantee completion of previous writes
<<Read KEY_CONTROL bits at index TMP_KEY_
    PROGRAM_STRUCT.KEYID>>
  break;
case KD_SET_KEY_RANDOM:
TMP_RND_KEY=<<Generate a random key using
    RDSEED>>
  if (NOT ENOUGH ENTROPY)
  {
  RFLAGS.ZF=1;
  RAX=ENTROPY_ERROR;
    goto EXIT;
  }
TMP_RND_TWEAK_KEY=<<Generate a random key
    using RDSEED>>
  if (NOT ENOUGH ENTROPY)
  {
  RFLAGS.ZF=1;
  RAX=ENTROPY_ERROR;
    goto EXIT;
  }
// Mix user supplied entropy to the data key and tweak key
TMP_RND_KEY=TMP_RND_KEY XOR
TMP_KEY_PROGRAM_STRUCT.USUPP_KEYID_
    KEY.BYTES[15:0];
TMP_RND_TWEAK_KEY=TMP_RND_TWEAK_KEY
    XOR
TMP_KEY_PROGRAM_STRUC-
    T.USUPP_KEYID_TWEAK_KEY.BYTES[15:0];
<<Write
KEY=TMP_RND_KEY,
TWEAK_KEY=TMP_RND_TWEAK_KEY,
KEY_CONTROL=2'b01,
to ME_KEY_TABLE at index TMP_KEY_PROGRAM_
    STRUCT.KEYID
>>
// Do a read to guarantee completion of previous writes
<<Read KEY_CONTROL bits at index TMP_KEY_
    PROGRAM_STRUCT.KEYID>>
  break;
case KD_CLEAR_KEY:
  <<Write
KEY='0,
    TWEAK_KEY='0,
KEY_CONTROL=2'b00,
to ME_KEY_TABLE at index TMP_KEY_PROGRAM_
    STRUCT.KEYID
>>
// Do a read to guarantee completion of previous writes
<<Read KEY_CONTROL bits at index TMP_KEY_
    PROGRAM_STRUCT.KEYID>>
  break;
case KD_NO_KEY:
  <<Write
KEY_CONTROL=2'b11,
to ME Key table at index TMP_KEY_PROGRAM_
    STRUCT.KEYID
>>
// Do a read to guarantee completion of previous writes
<<Read KEY_CONTROL bits at index TMP_KEY_
    PROGRAM_STRUCT.KEYID>>
  break;
}
RAX=0;
RFLAGS.ZF=0;
// Release Lock
KEY_TABLE_LOCK(RELEASE);
EXIT:
RFLAGS.CF=0;
RFLAGS.PF=0;
RFLAGS.AF=0;
RFLAGS.OF=0;
RFLAGS.SF=0;
}
```

Figure 4:
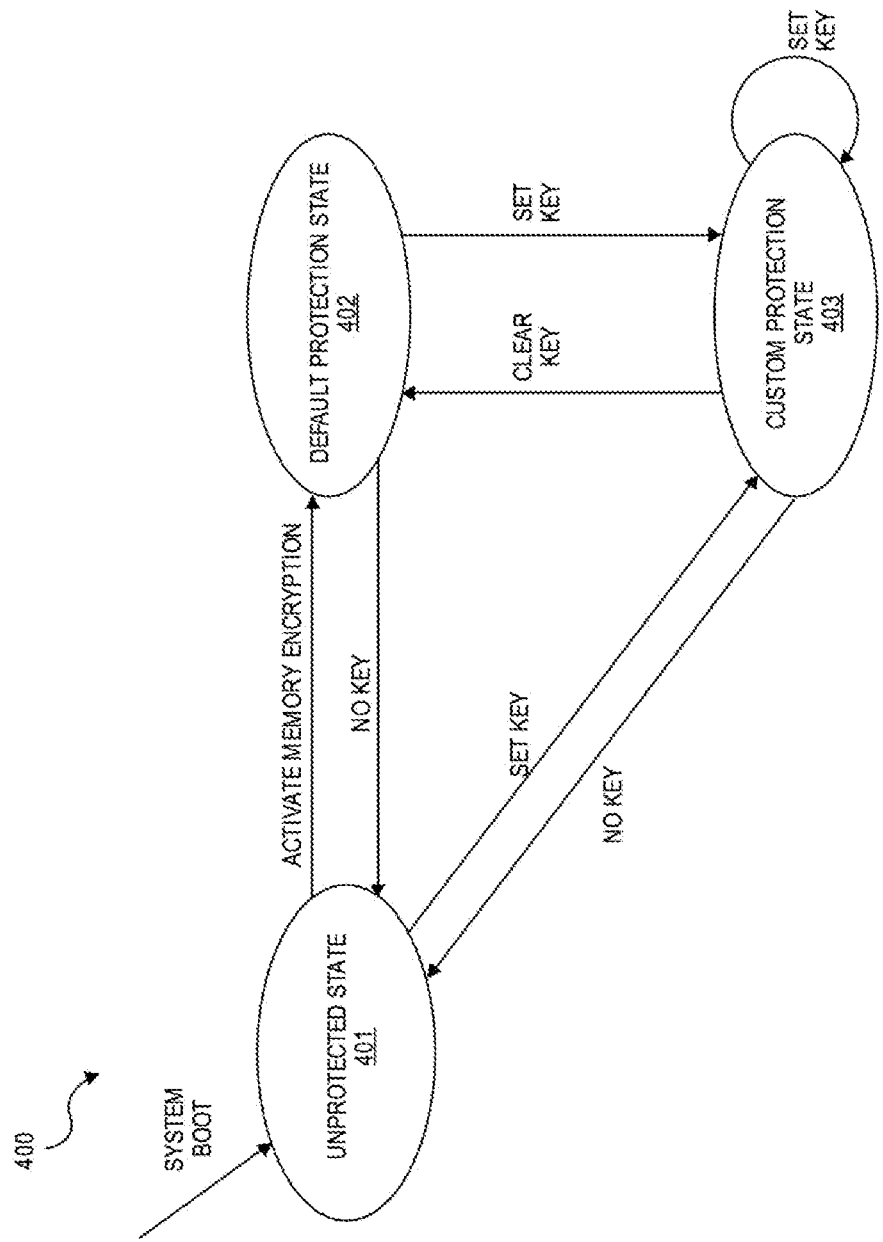
FIG. 4 illustrates a state machine for an example embodiment of cryptographic memory protection.

FIG. 4 illustrates a state machine 400 for an example embodiment of cryptographic memory protection. State machine 400 illustrates the lifecycle of a domain protected using cryptographic memory protection. For example, state machine 400 includes three protection states for a particular domain: the unprotected state 401, the default protection state 402, and the custom protection state 403. State machine 400 transitions between these states based on key programming commands. For example, in some embodiments, the key programming commands associated with the key program leaf of the PCONFIG instruction (e.g., as described in connection with FIG. 3 and TABLE 7) may be used to transition between states of state machine 400.

After a system boot or reset, the initial state of state machine 400 for a particular domain is the unprotected state 401, where the domain is protected in plaintext (e.g., unencrypted) mode.

Once memory encryption is activated for the system (e.g., using the memory encryption activation register (ME_ACTIVATE_MSR) of TABLE 2), state machine 400 transitions to the default protection state 402, where the domain is protected in default encryption mode (e.g., using a default or global encryption key).

If a "set key" command (e.g., KD_SET_KEY_DIRECT or KD_SET_KEY_RANDOM of TABLE 7) is issued while in the unprotected state 401 or the default protection state 402, state machine 400 transitions to the custom protection state 403, where the domain is protected using a unique encryption key. If another "set key" command (e.g., KD_SET_KEY_DIRECT or KD_SET_KEY_RANDOM of TABLE 7) is issued while in the custom protection state 403, a new key is programmed for the domain and state machine 400 remains in the custom protection state 403.

If a "clear key" command (e.g., KD_CLEAR_KEY of TABLE 7) is issued while in the custom protection state 403, the unique encryption key for the domain is cleared, and state machine 400 transitions back to the default protection state 402, where the domain is protected in default encryption mode (e.g., using a default or global encryption key).

If a "no key" command (e.g., KD_NO_KEY of TABLE 7) is issued while in the default protection state 402 or the custom protection state 403, state machine 400 transitions back to the unprotected state 401, where the domain is protected in plaintext (e.g., unencrypted) mode.

Figure 5:
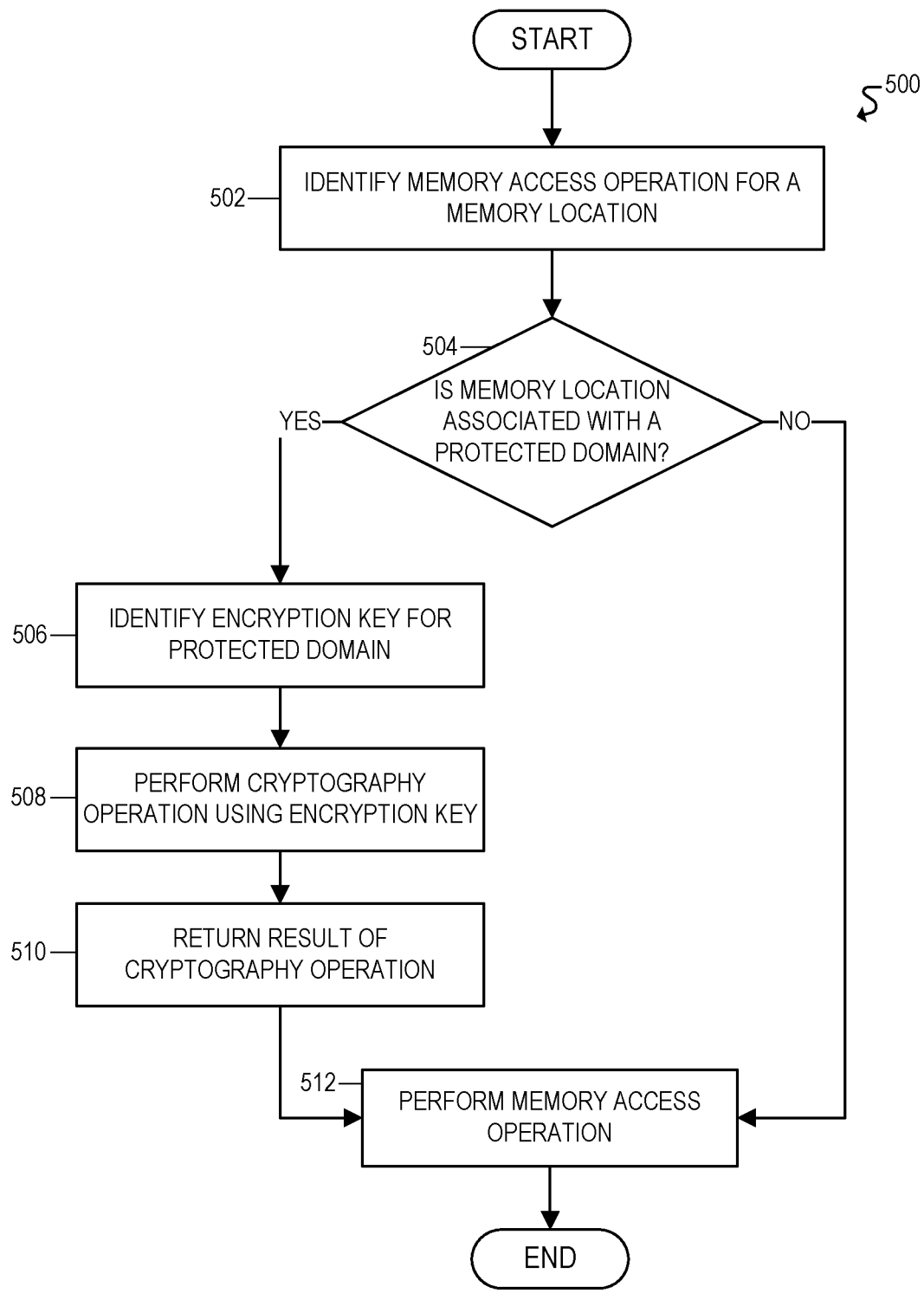
FIG. 5 illustrates a flowchart for an example embodiment of cryptographic memory protection.
Figure 6:
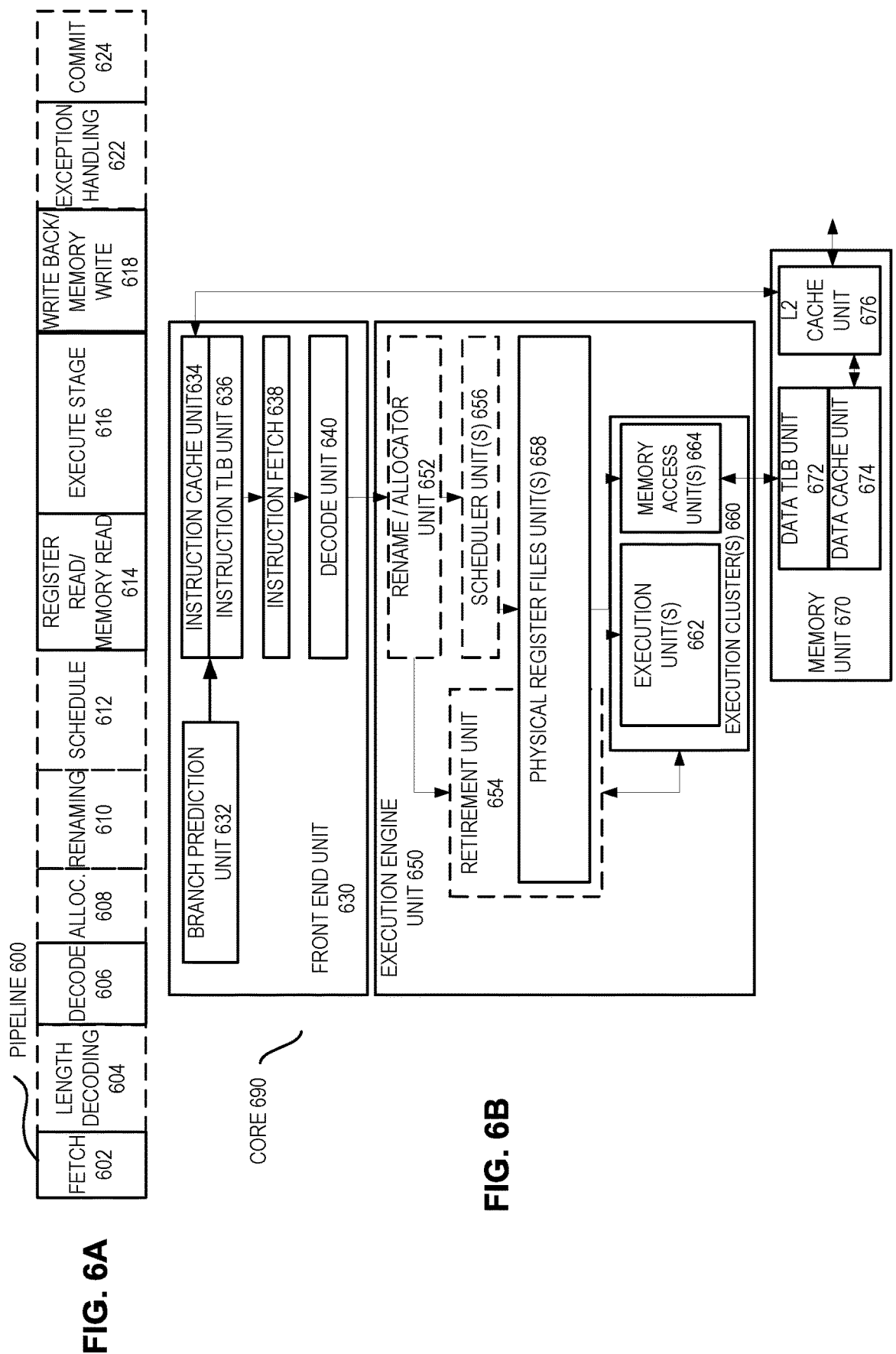
FIGS. 6A-B, 7, 8, 9, and 10 illustrate example computer architectures that can be used in accordance with embodiments disclosed herein.

FIG. 5 illustrates a flowchart 500 for an example embodiment of cryptographic memory protection. Flowchart 500 may be implemented, in some embodiments, using the embodiments and functionality described throughout this disclosure.

The flowchart may begin at block 502 by identifying a memory access operation for a particular memory location. The memory access operation, for example, could be a read operation to read data from the memory location, or a write operation to write data to the memory location.

The flowchart may then proceed to block 504 to determine whether the memory location is associated with a protected domain. A "domain," for example, may be viewed as a collection of resources associated with a particular workload or execution context, which may include any regions of memory containing data associated with the workload. Moreover, in some cases, there may be a plurality of workloads associated with different tenants, users, and/or customers (e.g., customers of a cloud service provider). Accordingly, protected domains can be defined to provide memory encryption protection for the various workloads. Moreover, each protected domain can be configured using various modes of protection, including plaintext mode (e.g., unencrypted), standard or default encryption mode (e.g., encrypted using a standard or default encryption key), and/or custom encryption mode (e.g., encrypted using a unique encryption key). In this manner, cryptographic isolation can be achieved for workloads of different tenants, users, and/or customers. In some embodiments, for example, a protected domain may be created and/or configured using a command, instruction, and/or register to identify a protection mode, encryption type, and/or encryption key for the protected domain.

If it is determined at block 504 that the memory location is NOT associated with a protected domain (and/or is protected using plaintext mode), the flowchart may then proceed to block 512 to perform the memory access operation (e.g., as it would normally be performed).

If it is determined at block 504 that the memory location is associated with a protected domain (and/or is protected using default or custom encryption mode), the flowchart may then proceed to block 506 to identify an encryption key associated with the protected domain. In some embodiments, an encryption type associated with the protected domain may also be identified.

The flowchart may then proceed to block 508 to perform a cryptography operation (e.g., an encrypt and/or decrypt operation) on data associated with the memory location using the encryption key for the protected domain. For example, for a read operation, data may be obtained from the memory location and may then be decrypted using the identified encryption key. For a write operation, data that is to be written to the memory location may first be encrypted using the identified encryption key.

The flowchart may then proceed to block 510 to return a result of the cryptography operation (e.g., an encrypt and/or decrypt operation), wherein the result of the cryptography operation is to be used for the memory access operation. For example, decrypted data is returned for a read operation, and encrypted data is returned for a write operation. The flowchart may then proceed to block 512 to perform the memory access operation (e.g., using the result of the cryptography operation).

At this point, the flowchart may be complete. In some embodiments, however, the flowchart may restart and/or certain blocks may be repeated. For example, in some embodiments, the flowchart may restart at block 502 to continue processing additional memory access operations.

Example Computing Architectures

FIGS. 6-10 illustrate example computer architectures that can be used in accordance with embodiments disclosed herein. For example, in various embodiments, the computer architectures of FIGS. 6-10 may be used in conjunction with, and/or may be used to implement, the cryptographic memory protection engine, architecture, and functionality described throughout this disclosure. Other computer architectures, system designs, and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 6A is a block diagram illustrating both an exemplary in-order pipeline and an exemplary register renaming, out-of-order issue/execution pipeline according to embodiments of the invention. FIG. 6B is a block diagram illustrating both an exemplary embodiment of an in-order architecture core and an exemplary register renaming, out-of-order issue/ execution architecture core to be included in a processor according to embodiments of the invention. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front end unit 630 coupled to an execution engine unit 650, and both are coupled to a memory unit 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode unit 640 or otherwise within the front end unit 630). The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 658 comprises a vector registers unit, a write mask registers unit, and a scalar registers unit. These register units may provide architectural vector registers, vector mask registers, and general purpose registers. The physical register file(s) unit(s) 658 is overlapped by the retirement unit 654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The instruction cache unit 634 is further coupled to a level 2 (L2) cache unit 676 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 690 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 634/674 and a shared L2 cache unit 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

In some embodiments, the platform configuration (PCONFIG) instruction described throughout this disclosure may be implemented using the processor architecture of FIGS. 6A-B. For example, instruction cache 634 may contain a PCONFIG instruction for configuring a protected domain based on a particular memory region, protection mode, encryption key, and/or encryption type. Accordingly, the PCONFIG instruction may be retrieved from instruction cache 634 and decoded by decoder 640, and execution unit 662 may then program or configure the protected domain in a memory encryption controller (e.g., memory protection controller 206 of FIG. 2).

Figure 7:
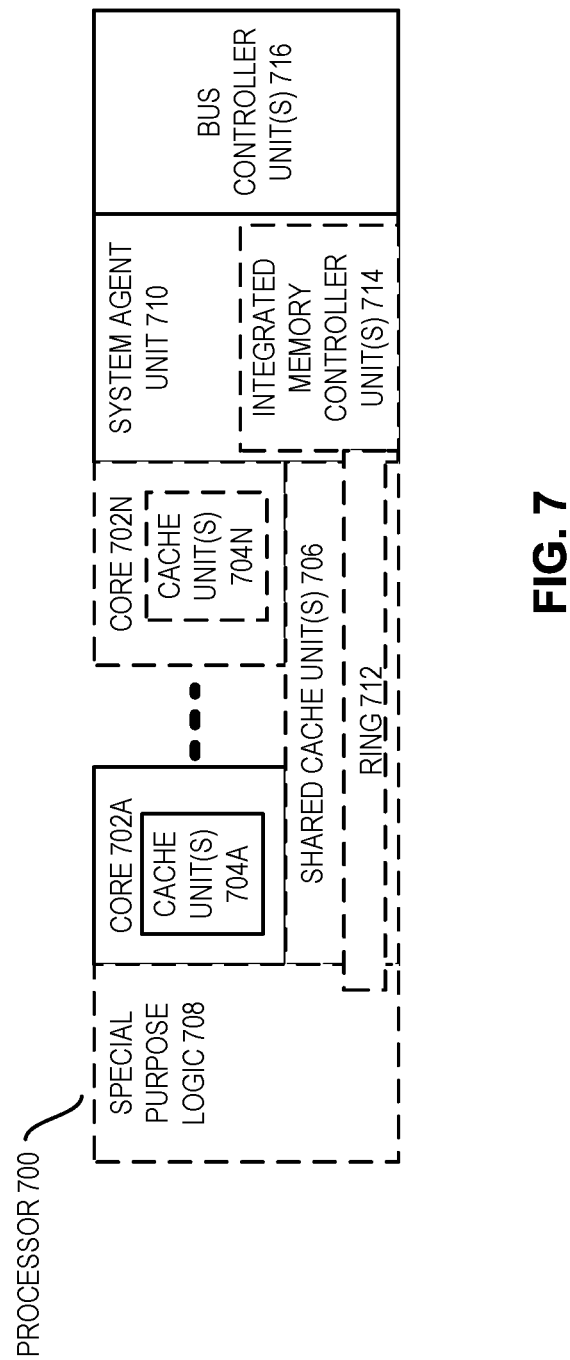

FIG. 7 is a block diagram of a processor 700 that may have more than one core, may have an integrated memory controller, and may have integrated graphics according to embodiments of the invention. The solid lined boxes in FIG. 7 illustrate a processor 700 with a single core 702A, a system agent 710, a set of one or more bus controller units 716, while the optional addition of the dashed lined boxes illustrates an alternative processor 700 with multiple cores 702A-N, a set of one or more integrated memory controller unit(s) 714 in the system agent unit 710, and special purpose logic 708.

Thus, different implementations of the processor 700 may include: 1) a CPU with the special purpose logic 708 being integrated graphics and/or scientific (throughput) logic (which may include one or more cores), and the cores 702A-N being one or more general purpose cores (e.g., general purpose in-order cores, general purpose out-of-order cores, a combination of the two); 2) a coprocessor with the cores 702A-N being a large number of special purpose cores intended primarily for graphics and/or scientific (throughput); and 3) a coprocessor with the cores 702A-N being a large number of general purpose in-order cores. Thus, the processor 700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 706, and external memory (not shown) coupled to the set of integrated memory controller units 714. The set of shared cache units 706 may include one or more mid-level caches, such as level 2 (L2), level 3 (L3), level 4 (L4), or other levels of cache, a last level cache (LLC), and/or combinations thereof. While in one embodiment a ring based interconnect unit 712 interconnects the integrated graphics logic 708, the set of shared cache units 706, and the system agent unit 710/integrated memory controller unit(s) 714, alternative embodiments may use any number of well-known techniques for interconnecting such units. In one embodiment, coherency is maintained between one or more cache units 706 and cores 702-A-N.

In some embodiments, one or more of the cores 702A-N are capable of multi-threading. The system agent 710 includes those components coordinating and operating cores 702A-N. The system agent unit 710 may include for example a power control unit (PCU) and a display unit. The PCU may be or include logic and components needed for regulating the power state of the cores 702A-N and the integrated graphics logic 708. The display unit is for driving one or more externally connected displays.

The cores 702A-N may be homogenous or heterogeneous in terms of architecture instruction set; that is, two or more of the cores 702A-N may be capable of execution the same instruction set, while others may be capable of executing only a subset of that instruction set or a different instruction set.

Figure 8:
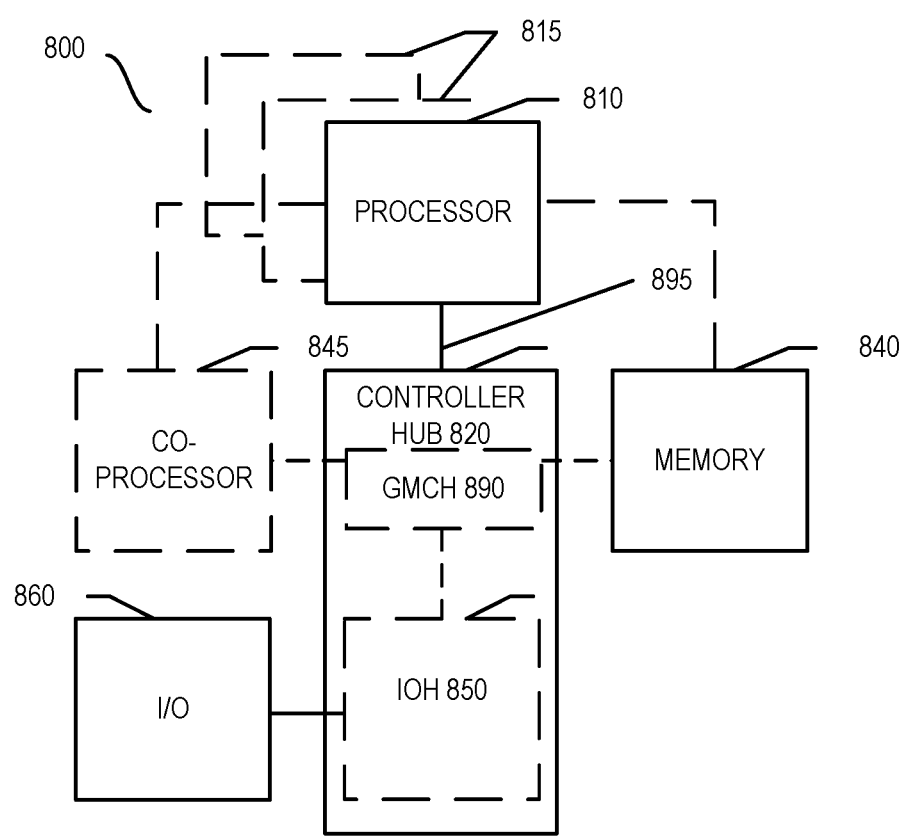

Referring now to FIG. 8, shown is a block diagram of a system 800 in accordance with one embodiment of the present invention. The system 800 may include one or more processors 810, 815, which are coupled to a controller hub 820. In one embodiment the controller hub 820 includes a graphics memory controller hub (GMCH) 890 and an Input/Output Hub (IOH) 850 (which may be on separate chips); the GMCH 890 includes memory and graphics controllers to which are coupled memory 840 and a coprocessor 845; the IOH 850 is couples input/output (I/O) devices 860 to the GMCH 890. Alternatively, one or both of the memory and graphics controllers are integrated within the processor (as described herein), the memory 840 and the coprocessor 845 are coupled directly to the processor 810, and the controller hub 820 in a single chip with the IOH 850.

The optional nature of additional processors 815 is denoted in FIG. 8 with broken lines. Each processor 810, 815 may include one or more of the processing cores described herein and may be some version of the processor 700.

The memory 840 may be, for example, dynamic random access memory (DRAM), phase change memory (PCM), or a combination of the two. For at least one embodiment, the controller hub 820 communicates with the processor(s) 810, 815 via a multi-drop bus, such as a frontside bus (FSB), point-to-point interface such as QuickPath Interconnect (QPI), or similar connection 895.

In one embodiment, the coprocessor 845 is a special-purpose processor, such as, for example, a high-throughput MIC processor, a network or communication processor, compression engine, graphics processor, GPGPU, embedded processor, or the like. In one embodiment, controller hub 820 may include an integrated graphics accelerator.

There can be a variety of differences between the physical resources 810, 815 in terms of a spectrum of metrics of merit including architectural, microarchitectural, thermal, power consumption characteristics, and the like.

In one embodiment, the processor 810 executes instructions that control data processing operations of a general type. Embedded within the instructions may be coprocessor instructions. The processor 810 recognizes these coprocessor instructions as being of a type that should be executed by the attached coprocessor 845. Accordingly, the processor 810 issues these coprocessor instructions (or control signals representing coprocessor instructions) on a coprocessor bus or other interconnect, to coprocessor 845. Coprocessor(s) 845 accept and execute the received coprocessor instructions.

Figure 9:
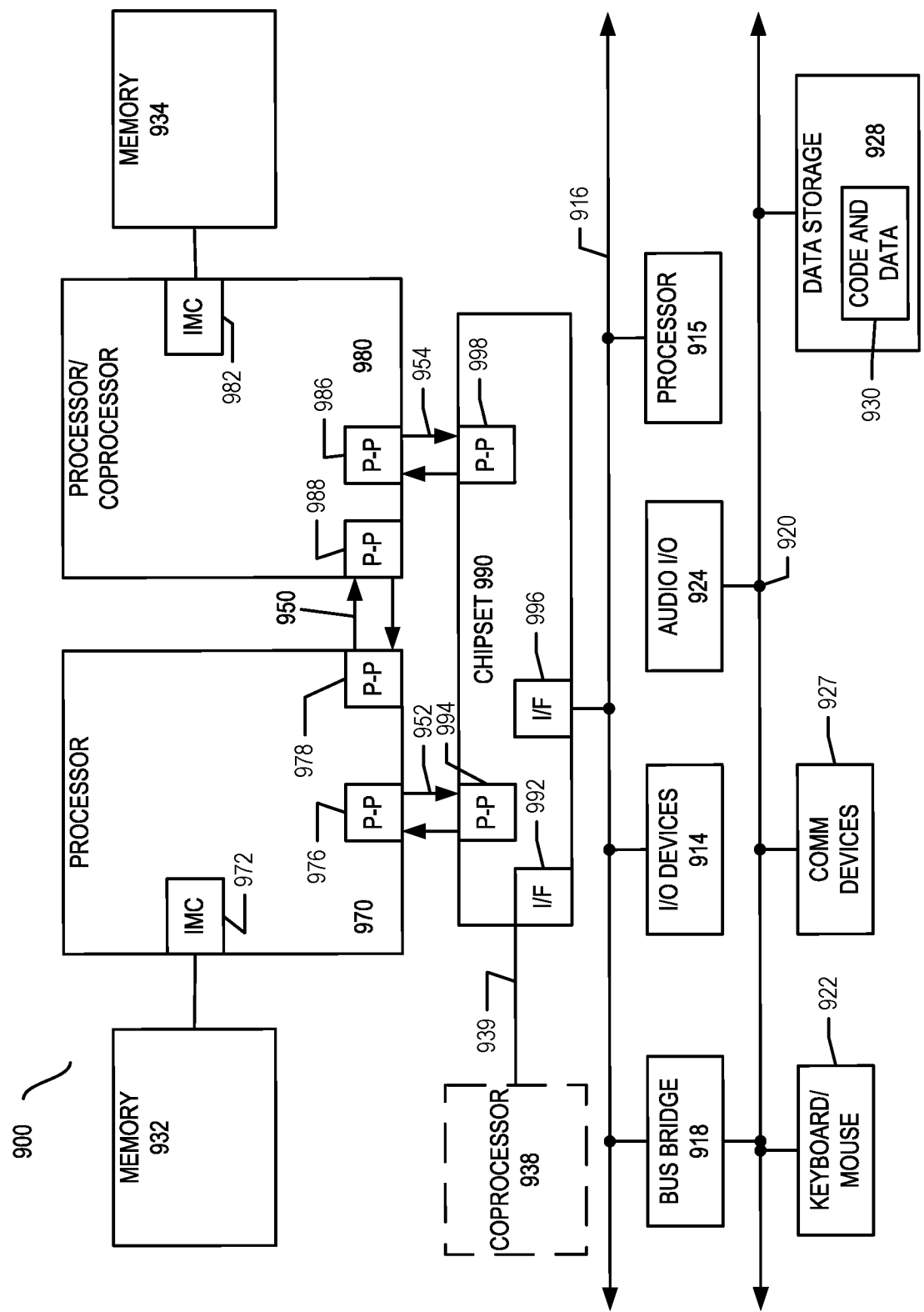

Referring now to FIG. 9, shown is a block diagram of a first more specific exemplary system 900 in accordance with an embodiment of the present invention. As shown in FIG. 9, multiprocessor system 900 is a point-to-point interconnect system, and includes a first processor 970 and a second processor 980 coupled via a point-to-point interconnect 950. Each of processors 970 and 980 may be some version of the processor 700. In one embodiment of the invention, processors 970 and 980 are respectively processors 810 and 815, while coprocessor 938 is coprocessor 845. In another embodiment, processors 970 and 980 are respectively processor 810 coprocessor 845.

Processors 970 and 980 are shown including integrated memory controller (IMC) units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, 998. Chipset 990 may optionally exchange information with the coprocessor 938 via a high-performance interface 939. In one embodiment, the coprocessor 938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present invention is not so limited.

As shown in FIG. 9, various I/O devices 914 may be coupled to first bus 916, along with a bus bridge 918 which couples first bus 916 to a second bus 920. In one embodiment, one or more additional processor(s) 915, such as coprocessors, high-throughput MIC processors, GPGPU's, accelerators (such as, e.g., graphics accelerators or digital signal processing (DSP) units), field programmable gate arrays, or any other processor, are coupled to first bus 916. In one embodiment, second bus 920 may be a low pin count (LPC) bus. Various devices may be coupled to a second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to the second bus 920. Note that other architectures are possible. For example, instead of the point-to-point architecture of FIG. 9, a system may implement a multi-drop bus or other such architecture.

Figure 10:
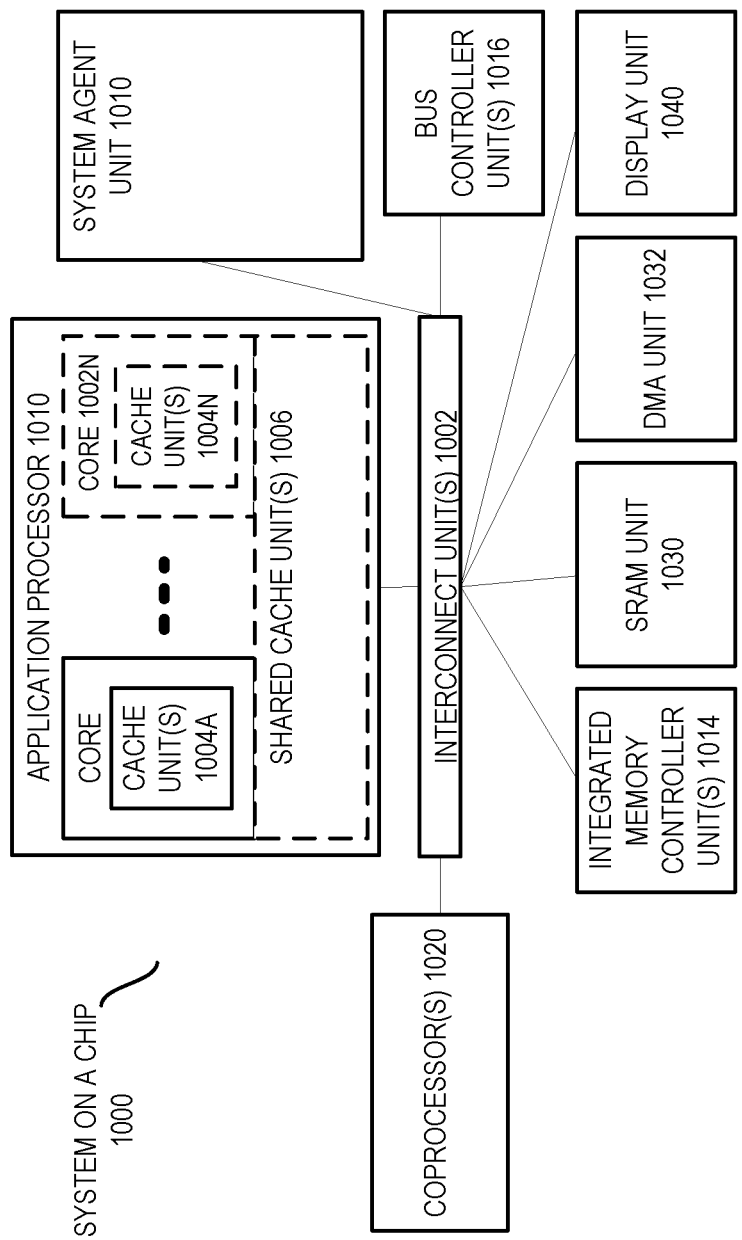

Referring now to FIG. 10, shown is a block diagram of a SoC 1000 in accordance with an embodiment of the present invention. Similar elements in FIG. 7 bear like reference numerals. Also, dashed lined boxes are optional features on more advanced SoCs. In FIG. 10, an interconnect unit(s) 1002 is coupled to: an application processor 1010 which includes a set of one or more cores 1002A-N and shared cache unit(s) 1006; a system agent unit 1010; a bus controller unit(s) 1016; an integrated memory controller unit(s) 1014; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 930 illustrated in FIG. 9, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

The flowcharts and block diagrams in the FIGURES illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing disclosure outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

As used throughout this specification, the term "processor" or "microprocessor" should be understood to include not only a traditional microprocessor (such as Intel's® industry-leading x86 and x64 architectures), but also graphics processors, matrix processors, and any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Example Implementations

The following examples pertain to embodiments described throughout this disclosure.

One or more embodiments may include an apparatus, comprising: a processor to execute one or more instructions, wherein the one or more instructions comprise a memory access operation associated with a memory location of a memory; a memory encryption controller to: identify the memory access operation associated with the memory location of the memory; determine that the memory location is associated with a protected domain, wherein the protected domain is associated with a protected memory region of the memory, and wherein the protected domain is identified from a plurality of protected domains associated with a plurality of protected memory regions of the memory; identify an encryption key associated with the protected domain; perform a cryptography operation on data associated with the memory access operation, wherein the cryptography operation is performed based on the encryption key associated with the protected domain; and return a result of the cryptography operation, wherein the result of the cryptography operation is to be used for the memory access operation.

In one example embodiment of an apparatus: the memory access operation comprises a memory read operation; and the memory encryption controller to perform the cryptography operation on the data associated with the memory access operation is further to: obtain the data from the memory location of the memory; and decrypt the data based on the encryption key associated with the protected domain.

In one example embodiment of an apparatus: the memory access operation comprises a memory write operation; and the memory encryption controller to perform the cryptography operation on the data associated with the memory access operation is further to encrypt the data based on the encryption key associated with the protected domain, wherein the result of the cryptography operation is to be written to the memory location of the memory.

In one example embodiment of an apparatus, the memory encryption controller to perform the cryptography operation on the data associated with the memory access operation is further to: identify an encryption type associated with the protected domain, wherein the plurality of protected domains is associated with a plurality of encryption types; and perform the cryptography operation based on the encryption type associated with the protected domain.

In one example embodiment of an apparatus: the plurality of protected domains comprises a plurality of execution contexts; and each protected domain of the plurality of protected domains comprises a particular execution context of the plurality of execution contexts.

In one example embodiment of an apparatus: the plurality of protected domains is further associated with a plurality of encryption keys; and each protected domain of the plurality of protected domains is associated with a particular encryption key of the plurality of encryption keys.

In one example embodiment of an apparatus: the plurality of protected domains is further associated with a plurality of users; and each protected domain of the plurality of protected domains is associated with a particular user of the plurality of users.

In one example embodiment of an apparatus, the memory encryption controller is further to: identify a command to add a second protected domain to the plurality of protected domains; identify a second protected memory region associated with the second protected domain; identify a second encryption key associated with the second protected domain; and configure the second protected domain based on the second protected memory region and the second encryption key.

In one example embodiment of an apparatus, the processor further comprises an instruction cache comprising a platform configuration instruction, wherein the platform configuration instruction comprises the command to add the second protected domain to the plurality of protected domains; a decoder to decode the platform configuration instruction; and an execution unit to program the second protected domain in the memory encryption controller.

In one example embodiment of an apparatus, the memory encryption controller is further to: determine a protection mode associated with the second protected domain; and configure the second protected domain based on the protection mode.

In one example embodiment of an apparatus, the protection mode comprises: plaintext mode; default encryption mode; or custom encryption mode.

One or more embodiments may include at least one machine accessible storage medium having instructions stored thereon, wherein the instructions, when executed on a machine, cause the machine to: identify a memory access operation associated with a memory location of a memory; determine that the memory location is associated with a protected domain, wherein the protected domain is associated with a protected memory region of the memory, and wherein the protected domain is identified from a plurality of protected domains associated with a plurality of protected memory regions of the memory; identify an encryption key associated with the protected domain; perform a cryptography operation on data associated with the memory access operation, wherein the cryptography operation is performed based on the encryption key associated with the protected domain; and return a result of the cryptography operation, wherein the result of the cryptography operation is to be used for the memory access operation.

In one example embodiment of a storage medium: the memory access operation comprises a memory read operation; and the instructions that cause the machine to perform the cryptography operation on the data associated with the memory access operation further cause the machine to: obtain the data from the memory location of the memory; and decrypt the data based on the encryption key associated with the protected domain.

In one example embodiment of a storage medium: the memory access operation comprises a memory write operation; and the instructions that cause the machine to perform the cryptography operation on the data associated with the memory access operation further cause the machine to encrypt the data based on the encryption key associated with the protected domain, wherein the result of the cryptography operation is to be written to the memory location of the memory.

In one example embodiment of a storage medium, the instructions that cause the machine to perform the cryptography operation on the data associated with the memory access operation further cause the machine to: identify an encryption type associated with the protected domain, wherein the plurality of protected domains is associated with a plurality of encryption types; and perform the cryptography operation based on the encryption type associated with the protected domain.

In one example embodiment of a storage medium: the plurality of protected domains comprises a plurality of execution contexts; and each protected domain of the plurality of protected domains comprises a particular execution context of the plurality of execution contexts.

In one example embodiment of a storage medium: the plurality of protected domains is further associated with a plurality of encryption keys; and each protected domain of the plurality of protected domains is associated with a particular encryption key of the plurality of encryption keys.

In one example embodiment of a storage medium: the plurality of protected domains is further associated with a plurality of users; and each protected domain of the plurality of protected domains is associated with a particular user of the plurality of users.

In one example embodiment of a storage medium, the instructions further cause the machine to: identify a command to add a second protected domain to the plurality of protected domains; identify a second protected memory region associated with the second protected domain; identify a second encryption key associated with the second protected domain; and configure the second protected domain based on the second protected memory region and the second encryption key.

In one example embodiment of a storage medium, the instructions further cause the machine to: determine a protection mode associated with the second protected domain; and configure the second protected domain based on the protection mode.

In one example embodiment of a storage medium, the protection mode comprises: plaintext mode; standard encryption mode; or custom encryption mode.

One or more embodiments may include a system, comprising: a memory; a processor to execute one or more instructions, wherein the one or more instructions comprise a memory access operation associated with a memory location of the memory; a memory encryption controller to: identify the memory access operation associated with the memory location of the memory; determine that the memory location is associated with a protected domain, wherein the protected domain is associated with a protected memory region of the memory, and wherein the protected domain is identified from a plurality of protected domains associated with a plurality of protected memory regions of the memory; identify an encryption key associated with the protected domain; perform a cryptography operation on data associated with the memory access operation, wherein the cryptography operation is performed based on the encryption key associated with the protected domain; and return a result of the cryptography operation, wherein the result of the cryptography operation is to be used for the memory access operation.

In one example embodiment of a system: the plurality of protected domains is further associated with a plurality of users of a cloud service provider; and each protected domain of the plurality of protected domains is associated with a particular user of the plurality of users.

In one example embodiment of a system, the memory comprises solid-state memory for providing persistent data storage.

One or more embodiments may include a method, comprising: identifying a memory access operation associated with a memory location of a memory; determining that the memory location is associated with a protected domain, wherein the protected domain is associated with a protected memory region of the memory, and wherein the protected domain is identified from a plurality of protected domains associated with a plurality of protected memory regions of the memory; identifying an encryption key associated with the protected domain; performing a cryptography operation on data associated with the memory access operation, wherein the cryptography operation is performed based on the encryption key associated with the protected domain; and returning a result of the cryptography operation, wherein the result of the cryptography operation is to be used for the memory access operation.

In one example embodiment of a method, the method further comprises: identifying a command to add a second protected domain to the plurality of protected domains; identifying a second protected memory region associated with the second protected domain; identifying a second encryption key associated with the second protected domain; and configuring the second protected domain based on the second protected memory region and the second encryption key.

What is claimed is:

1. An apparatus, comprising:
a processor core to execute one or more instructions, wherein the one or more instructions at least comprise a memory access operation associated with a memory location of a memory, wherein the processor core is to include a plurality of configuration register to configure usage of a memory encryption controller and is to support a platform configuration instruction to program an encryption key and an indication of an encryption mode for a protected domain, wherein the plurality of configuration registers at least include:
a first configuration register to at least detail capabilities of the memory encryption controller including an indication of a supported encryption algorithm, a maximum number of keys, and a maximum number of bits per key identifier,
a second configuration register to at least detail read-only lock activation, memory encryption enablement, and a default encryption algorithm, and
a third configuration register to identify memory addresses to be excluded from memory encryption protection; and
a memory encryption controller to:
identify the memory access operation associated with the memory location of the memory;
determine that the memory location is associated with a protected domain, wherein the protected domain is associated with a protected memory region of the memory, and wherein the protected domain is identified from a plurality of protected domains associated with a plurality of protected memory regions of the memory;
identify an encryption key associated with the protected domain;
perform a cryptography operation on data associated with the memory access operation, wherein the cryptography operation is performed based on the encryption key associated with the protected domain; and
return a result of the cryptography operation, wherein the result of the cryptography operation is to be used for the memory access operation.

2. The apparatus of claim 1,
wherein the memory access operation comprises a memory read operation; and
wherein the memory encryption controller to perform the cryptography operation on the data associated with the memory access operation is further to:
obtain the data from the memory location of the memory; and
decrypt the data based on the encryption key associated with the protected domain.

3. The apparatus of claim 1,
wherein the memory access operation comprises a memory write operation; and
wherein the memory encryption controller to perform the cryptography operation on the data associated with the memory access operation is further to encrypt the data based on the encryption key associated with the protected domain, wherein the result of the cryptography operation is to be written to the memory location of the memory.

4. The apparatus of claim 1, wherein the memory encryption controller to perform the cryptography operation on the data associated with the memory access operation is further to:
identify an encryption type associated with the protected domain, wherein the plurality of protected domains is associated with a plurality of encryption types; and
perform the cryptography operation based on the encryption type associated with the protected domain.

5. The apparatus of claim 1,
wherein the plurality of protected domains comprises a plurality of execution contexts; and
wherein each protected domain of the plurality of protected domains comprises a particular execution context of the plurality of execution contexts.

6. The apparatus of claim 1,
wherein the plurality of protected domains is further associated with a plurality of encryption keys; and
wherein each protected domain of the plurality of protected domains is associated with a particular encryption key of the plurality of encryption keys.

7. The apparatus of claim 6,
wherein the plurality of protected domains is further associated with a plurality of users; and
wherein each protected domain of the plurality of protected domains is associated with a particular user of the plurality of users.

8. The apparatus of claim 1, wherein the memory encryption controller is further to:
identify a command to add a second protected domain to the plurality of protected domains;
identify a second protected memory region associated with the second protected domain;
identify a second encryption key associated with the second protected domain; and
configure the second protected domain based on the second protected memory region and the second encryption key.

9. The apparatus of claim 8, wherein the processor core further comprises:
an instruction cache comprising a platform configuration instruction, wherein the platform configuration instruction comprises the command to add the second protected domain to the plurality of protected domains;
a decoder to decode the platform configuration instruction; and
an execution unit to program the second protected domain in the memory encryption controller.

10. The apparatus of claim 8, wherein the memory encryption controller is further to:
determine a protection mode associated with the second protected domain; and
configure the second protected domain based on the protection mode.

11. The apparatus of claim 10, wherein the protection mode comprises:
plaintext mode; default encryption mode; or custom encryption mode.

12. An apparatus comprising:
a multikey memory encryption circuitry to protect data stored in memory using one or more encryption keys to be stored in a key data structure; and a processor core to execute instructions coupled to the multikey memory encryption circuitry, the processor core to include a plurality of control registers (CRs) to configure usage of the multikey memory encryption circuitry and the processor core to support a platform configuration instruction to program a key of a domain using a key program structure, wherein an entry of the key data structure is to include a key identifier, an encryption key, and an indication of an encryption mode and wherein a CR of the plurality of CRs is a capability CR programmable to enumerate an encryption algorithm to be used by the memory encryption circuitry, indicate a programmable number of bits allocatable as key identifiers in the key data structure, and indicate a programmable number of bits used for a number of supporting keys.

13. The apparatus of claim 12, wherein the encryption algorithm is AES-XTS.

14. The apparatus of claim 12, wherein the processor is to support a platform configuration instruction to program the encryption key and the indication of the encryption mode.

15. The apparatus of claim 12, wherein a CR of the plurality of CRs is an activate CR to be used to enable multikey memory encryption circuitry usage.

16. The apparatus of claim 12, wherein a CR of the plurality of CRs is an exclude mask CR to be used to identify bits of a memory address that must match an exclusion base address to qualify as an excluded memory range.

17. The apparatus of claim 16, wherein a CR of the plurality of one CRs is an exclude base CR to be used to store the exclusion base address.

* * * * *